US012083802B2

(12) United States Patent
Hayashi et al.

(10) Patent No.: US 12,083,802 B2
(45) Date of Patent: Sep. 10, 2024

(54) TANK SET AND LIQUID-CONSUMING APPARATUS

(71) Applicant: BROTHER KOGYO KABUSHIKI KAISHA, Nagoya (JP)

(72) Inventors: Masahiro Hayashi, Nagoya (JP); Taichi Shirono, Nagoya (JP); Masako Kawagoe, Nagoya (JP); Yoshinori Osakabe, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/171,450

(22) Filed: Feb. 20, 2023

(65) Prior Publication Data

US 2023/0405997 A1 Dec. 21, 2023

Related U.S. Application Data

(63) Continuation of application No. 17/675,076, filed on Feb. 18, 2022, now Pat. No. 11,584,136, which is a (Continued)

(30) Foreign Application Priority Data

Mar. 31, 2016 (JP) ................................ 2016-073590

(51) Int. Cl.

*B41J 2/175* (2006.01)
*B41J 29/02* (2006.01)
*B41J 29/13* (2006.01)

(52) U.S. Cl.

CPC ....... *B41J 2/17553* (2013.01); *B41J 2/17509* (2013.01); *B41J 2/17513* (2013.01);

(Continued)

(58) Field of Classification Search

CPC ......................... B41J 2/17553; B41J 2/17509; B41J 2/17513; B41J 2/17523; B41J 29/02;

(Continued)

(56) References Cited

U.S. PATENT DOCUMENTS 5,172,821 A 12/1992 Knopf
6,390,611 B1 5/2002 Kobayashi et al.

(Continued)

FOREIGN PATENT DOCUMENTS

CN 206394244 U 8/2017
EP 2 095 955 A1 9/2009

(Continued)

OTHER PUBLICATIONS

Notification of First Office Action issued in related Chinese Patent Application No. 201710188893.0, Aug. 28, 2019.

(Continued)

*Primary Examiner* — Kristal Feggins
(74) *Attorney, Agent, or Firm* — Merchant & Gould P.C.

(57) ABSTRACT

A tank set includes: tanks arranged in a predetermined direction, each of the tanks being composed of a casing including: a liquid storage chamber defined by mutually opposing two surfaces and configured to store liquid; an inlet provided to inject the liquid into the liquid storage chamber; and a liquid outflow port through which the liquid flows out from the liquid storage chamber to a liquid-consuming unit. Each of the two surfaces extends in a direction intersecting the predetermined direction, and is at least partially composed of a film.

8 Claims, 16 Drawing Sheets

Related U.S. Application Data continuation of application No. 16/843,938, filed on Apr. 9, 2020, now Pat. No. 11,279,140, which is a continuation of application No. 15/473,917, filed on Mar. 30, 2017, now Pat. No. 10,618,299.

(52) U.S. Cl.
CPC ....... *B41J 2/17523* (2013.01); *B41J 2/17566* (2013.01); *B41J 29/02* (2013.01); *B41J 29/13* (2013.01); *B41J 2002/17573* (2013.01)

(58) Field of Classification Search
CPC .......... B41J 2/17566; B41J 2002/17573; B41J 2/17503; B41J 29/13; B41J 2/17563; B41J 2/17593; B41J 2/17596; B41J 2/18
See application file for complete search history.

(56) References Cited

U.S. PATENT DOCUMENTS

| | | | |
|---|---|---|---|
| 7,090,341 | B1 | 8/2006 | Miyazawa |
| 9,469,118 | B2 | 10/2016 | Kimura et al. |
| 9,505,222 | B2 | 11/2016 | Igarashi et al. |
| 2008/0303883 | A1 | 12/2008 | Miyazawa |
| 2010/0225704 | A1 | 9/2010 | Aoki et al. |
| 2012/0056938 | A1 | 3/2012 | Ishizawa et al. |
| 2015/0124028 | A1 | 5/2015 | Kimura et al. |
| 2016/0009096 | A1 | 1/2016 | Suzuki et al. |
| 2016/0279957 | A1 | 9/2016 | Kudo et al. |
| 2018/0281433 | A1 | 10/2018 | Oya et al. |

FOREIGN PATENT DOCUMENTS

| | | | | |
|---|---|---|---|---|
| JP | 2003-312016 | A | 11/2003 | |
| JP | 2007-125829 | A | 5/2007 | |
| JP | 2007125829 | * | 5/2007 | ................ B41J 3/04 |
| JP | 2008-93869 | A | 4/2008 | |
| JP | 2010-208038 | A | 9/2010 | |
| JP | 2012-051306 | A | 3/2012 | |
| JP | 5429425 | B2 | 2/2014 | |
| JP | 5621902 | B2 | 11/2014 | |
| JP | 2015-027807 | A | 2/2015 | |
| JP | 2016-182731 | A | 10/2016 | |
| JP | 2017-13243 | A | 1/2017 | |
| WO | 00/03877 | A1 | 1/2000 | |
| WO | 2017/090374 | A1 | 6/2017 | |

OTHER PUBLICATIONS

Office Action (Notice of Reasons for Refusal) issued in corresponding Japanese Patent Application No. 2016-073590, Feb. 4, 2020.

Notification of Second Office Action issued in related Chinese Patent Application 201710188893.0, Apr. 8, 2020.

Office Action (Final Notice of Reasons for Refusal) issued in corresponding Japanese Patent Application No. 2016-073590, Dec. 1, 2020.

Office Action (Notification of Third Office Action) issued in corresponding Chinese Patent Application No. 201710188893.0, Oct. 28, 2020.

Decision of Refusal issued in corresponding Japanese Patent Application No. 2016-073590; Jun. 22, 2021.

Decision of Dismissal of Amendment issued in corresponding Japanese Patent Application No. 2016-073590; Jun. 22, 2021.

Office Action (Notice of Reasons for Refusal) issued in corresponding Japanese Patent Application No. 2021-152979, Sep. 6, 2022.

Notice of Allowance issued in U.S. Appl. No. 17/675,076 on Oct. 19, 2022.

Office Action (Notice of Reasons for Refusal) issued in corresponding Japanese Patent Application No. 2021-152979, Apr. 11, 2023.

Decision of Refusal issued in corresponding Japanese Patent Application No. 2021-152979, Nov. 7, 2023.

Decision of Dismissal of Amendment issued in corresponding Japanese Patent Application No. 2021-152979, Nov. 7, 2023.

* cited by examiner

TANK SET AND LIQUID-CONSUMING APPARATUS

REFERENCE TO RELATED APPLICATIONS

The present application is a continuation of U.S. patent application Ser. No. 17/675,076, filed Feb. 18, 2022, now U.S. Pat. No. 11,584,136, which is a continuation of U.S. patent application Ser. No. 16/843,938, filed Apr. 9, 2020, now U.S. Pat. No. 11,279,140 issued Mar. 22, 2022, which is a continuation of U.S. patent application Ser. No. 15/473,917, filed Mar. 30, 2017, now U.S. Pat. No. 10,618,299 issued Apr. 14, 2020, which further claims priority from Japanese Patent Application No. 2016-073590, filed on Mar. 31, 2016, the disclosures of all of which are incorporated herein by reference in their entirety.

BACKGROUND ART

The present invention relates to a tank set having a plurality of tanks for which liquids can be supplemented via inlets, and a liquid-consuming apparatus to which the tank set is installed.

A printer is known, which is provided with a tank for which an ink can be supplemented, and a recording head which discharges the ink supplied from the tank from nozzles to record an image on the recording paper. When the ink contained in the tank is consumed, the user can supplement the ink stored in a bottle from an inlet of the tank.

Another printer is known, which is provided with a plurality of tanks. For example, a printer, which is capable of performing the color printing, is generally provided with a plurality of tanks corresponding to inks of respective colors of black, cyan, magenta, and yellow. Usually, the plurality of tanks is arranged in a state of being aligned in one array.

DESCRIPTION

It is desirable that the ink is stored in each of the tanks in an amount as large as possible. On the other hand, it is desirable that the space occupied by the plurality of tanks is as small as possible.

The present teaching has been made taking the foregoing circumstances into consideration, an object of which is to provide a tank set which makes it possible to increase the liquid amount capable of being stored in each of tanks, while maintaining a small space occupied by the plurality of tanks.

According to a first aspect of the present teaching, there is provided a tank set including: tanks arranged in a predetermined direction, each of the tanks being composed of a casing including: a liquid storage chamber defined by mutually opposing two surfaces and configured to store liquid; an inlet provided to inject the liquid into the liquid storage chamber; and a liquid outflow port through which the liquid flows out from the liquid storage chamber to a liquid-consuming unit, wherein each of the two surfaces extends in a direction intersecting the predetermined direction, and is at least partially composed of a film.

According to the structure as described above, at least a part of each of the two surfaces is composed of the film. In this case, the film is thin. Therefore, it is possible to shorten the length of the tank set in relation to the predetermined direction in which the tanks are aligned.

Further, if the dimension or size of the outer shape of the tank in which at least a part of each of the two surfaces is composed of the film is the same as that of a tank in which two surfaces are not composed of films, the former tank can store the liquid in a larger amount as compared with the latter tank. In other words, according to the structure as described above, it is possible to increase the amount of the liquid capable of being stored in each of the tanks of the tank set.

According to a second aspect of the present teaching, there is provided a tank set including: tanks arranged in a predetermined direction, each of the tanks being composed of a casing including: a liquid storage chamber defined by mutually opposing two surfaces and configured to store liquid; an inlet provided to inject the liquid into the liquid storage chamber; and a liquid outflow port through which the liquid flows out from the liquid storage chamber to a liquid-consuming unit, wherein the two surfaces of each of the tanks include a surface at least partially composed of a film, the tanks include a first tank and a second tank arranged in the predetermined direction and adjoining mutually, and the first tank and the second tank are arranged such that the surface, of the first tank, at least partially composed of the film and the surface, of the second tank, at least partially composed of the film are opposed to one another.

In ordinary cases, the gap, which is at least in an amount corresponding to the allowable error (tolerance), is provided between the two mutually adjoining tanks. According to the structure as described above, the two mutually adjoining tanks are arranged such that the surfaces, in which at least the parts are composed of the films, are mutually opposed to one another. Accordingly, such a state is given that the film is expanded by the liquid pressure of the liquid toward the mutually adjoining tank adjacent to the predetermined tank, in such a situation that the liquid is stored in the liquid storage chamber of the predetermined tank having the film. It is possible to increase the amount of the liquid stored in the liquid storage chamber by an amount of the expansion.

According to a third aspect of the present teaching, there is provided a liquid-consuming apparatus including the tank set according to the first or second aspect of the present teaching; and the liquid-consuming unit.

Figure 1A:
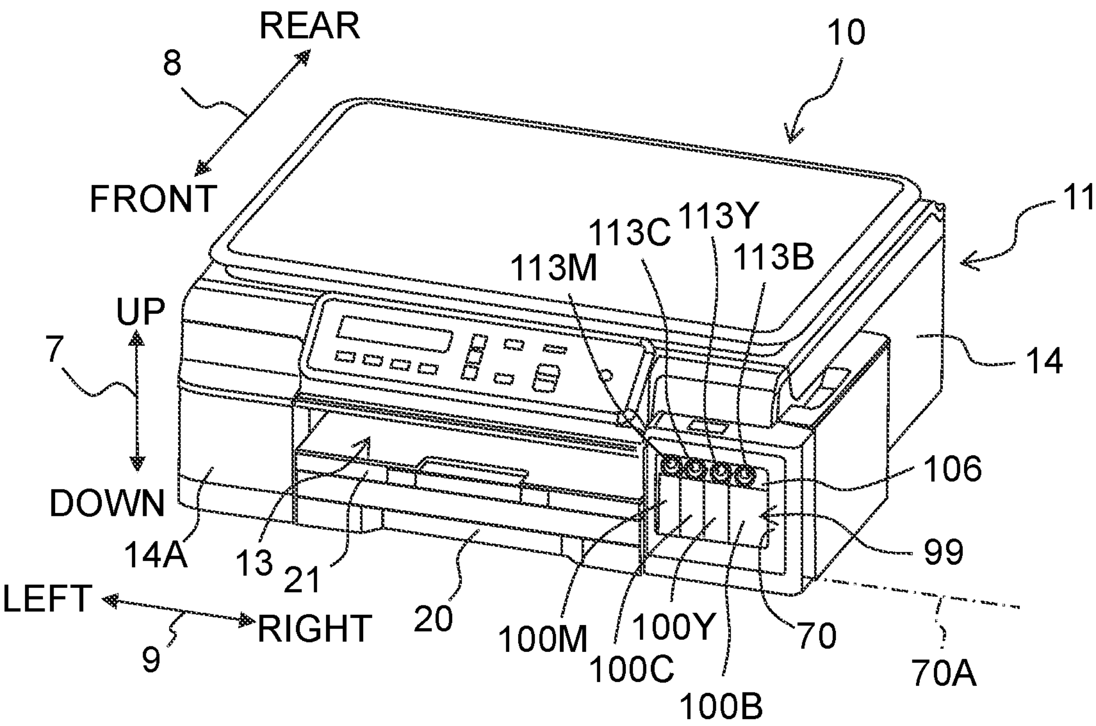
FIG. 1A is a perspective view of external appearance of a multifunction peripheral in a state where a cover is in a closed position.

An embodiment of the present teaching will be explained below. Note that the embodiment explained below is merely an example of the present teaching. It goes without saying that the embodiment of the present teaching can be appropriately changed within a range without changing the gist or essential characteristics of the present teaching. In the following explanation, the attitude or posture (attitude depicted in FIGS. 1A and 1B), in which the multifunction peripheral 10 and the ink tank 100 set up for the multifunction peripheral 10 are usably disposed on the horizontal plane, is referred to as "usable attitude". The up-down direction 7 is defined based on the usable attitude. The front-rear direction 8 is defined assuming that the surface, on which an opening 13 of the multifunction peripheral 10 is provided, is the front surface. The left-right direction 9 is defined while the multifunction peripheral 10 is viewed from the front surface. In this embodiment, in the usable attitude, the up-down direction 7 corresponds to the vertical direction, and the front-rear direction 8 and the left-right direction 9 correspond to the horizontal direction. Note that the upward direction (orientation) is a component of the up-down direction 7, and the downward direction (orientation) is also a component of the up-down direction. Similarly, the leftward direction (orientation) and the rightward direction (orientation) are components of the left-right direction 9 respectively. The frontward direction (orientation) and the rearward direction (orientation) are components of the front-rear direction 8 respectively.

<Overall Structure of Multifunction Peripheral 10>

Figure 1B:
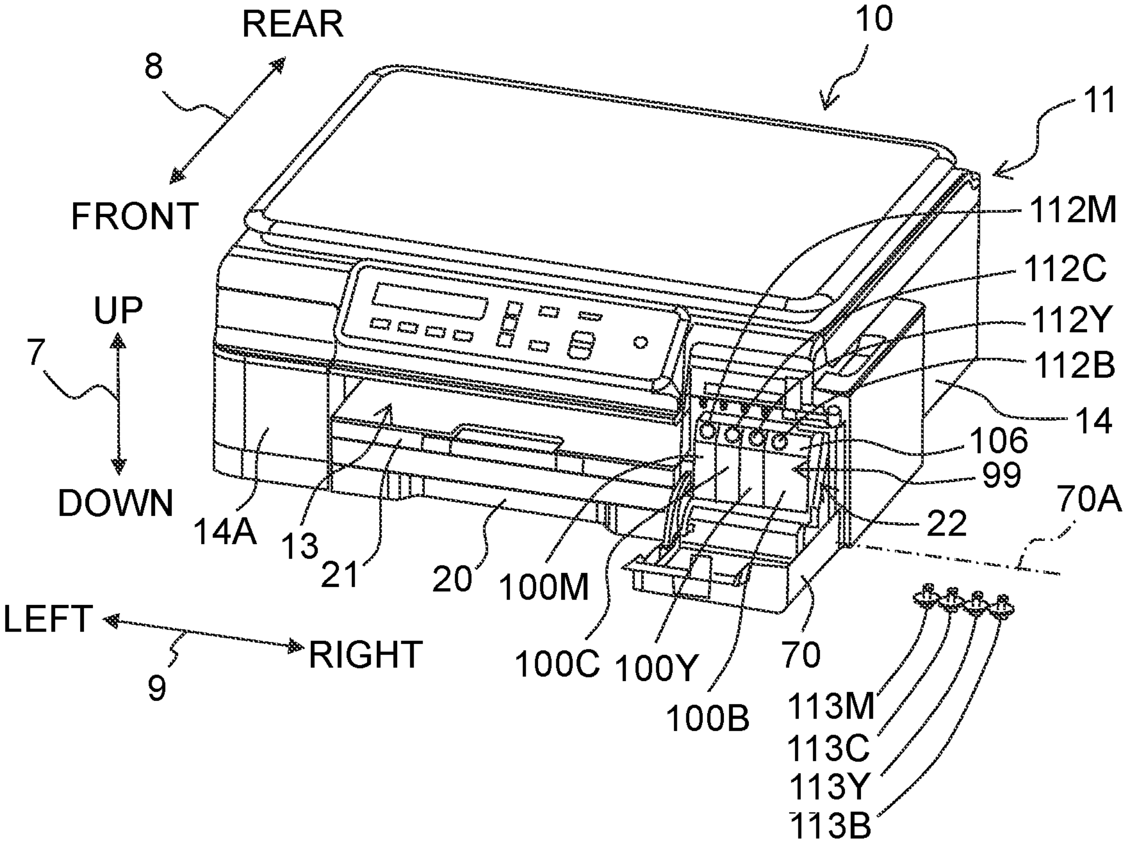
FIG. 1B is a perspective view of external appearance of the multifunction peripheral in a state where the cover is in an open position.
Figure 2:
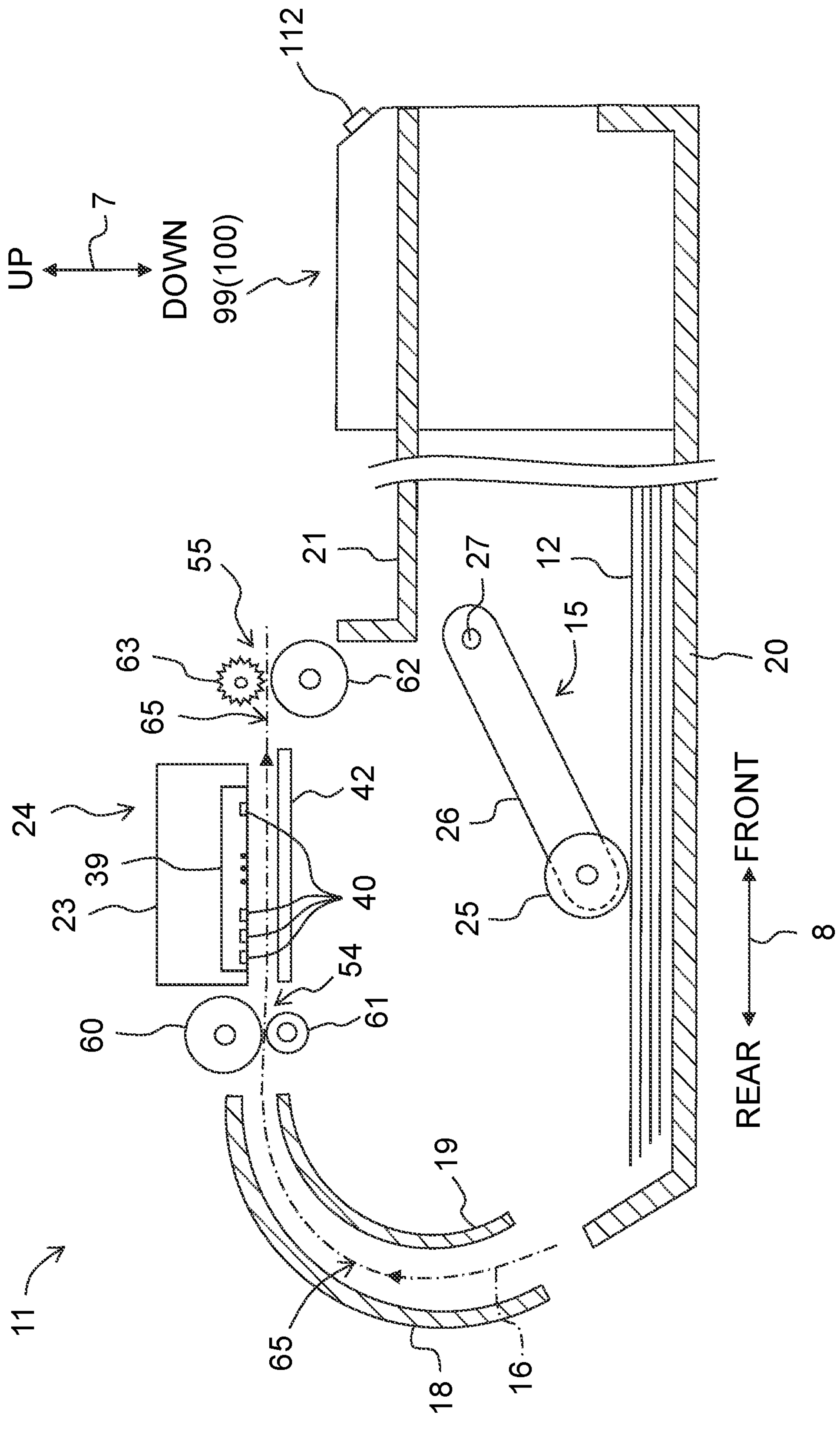
FIG. 2 is a longitudinal cross-sectional view depicting schematically an internal structure of a printer unit.

As depicted in FIG. 1, the multifunction peripheral 10 (example of the apparatus) generally has a rectangular parallelepiped shape. The multifunction peripheral 10 is provided, at its lower portion, with a printer unit 11 which records an image on the recording paper 12 (see FIG. 2) in accordance with the ink-jet recording system. The printer unit 11 has a casing 14. An opening 13 is formed through a front wall 14A of the casing. As depicted in FIG. 2, those arranged in the casing 14 are a feed unit 15, a feed tray 20, a discharge tray 21, a conveyance roller unit 54, a recording unit 24, a discharge roller unit 55, a platen 42, and a tank set 99. The multifunction peripheral 10 has various functions including, for example, the facsimile function and the printing function.

<Feed Tray 20, Discharge Tray 21>

The opening 13 is formed at a central portion in the left-right direction 9 on a front surface of the multifunction peripheral 10. As depicted in FIGS. 1A and 1B, the feed tray 20 is inserted into and withdrawn from the multifunction peripheral 10 in the front-rear direction 8 via the opening 13 by a user. The feed tray 20 can support a plurality of stacked sheets of the recording paper 12. The discharge tray 21 is arranged over or above the feed tray 20, and the discharge tray 21 is inserted and withdrawn together with the feed tray 20. The discharge tray 21 supports the recording paper 12 discharged from the space between the recording unit 24 and the platen 42 by the discharge roller unit 55.

<Feed Unit 15>

The feed unit 15 feeds, to a conveyance passage (conveyance route) 65, the recording paper 12 supported by the feed tray 20. As depicted in FIG. 2, the feed unit 15 is provided with a feed roller 25, a feed arm 26, and a shaft 27. The feed roller 25 is rotatably supported at the forward end of the feed arm 26. The feed roller 25 rotates in the direction (orientation) to convey the recording paper 12 in the conveyance direction (orientation) 16 in accordance with the reverse rotation of a conveyance motor (not depicted). In the following description, the rotation, in which the feed roller 25, the conveyance roller 60, and the discharge roller 62 are rotated in the direction (orientation) to convey the recording paper 12 in the conveyance direction 16, is referred to as "forward rotation". The feed arm 26 is rotatably supported by the shaft 27 which is supported by a frame of the printer unit 11. The feed arm 26 is urged so that the feed arm 26 is rotated toward the feed tray 20 by means of the self-weight or the elastic force brought about by a spring or the like.

<Conveyance Passage 65>

Figure 3:
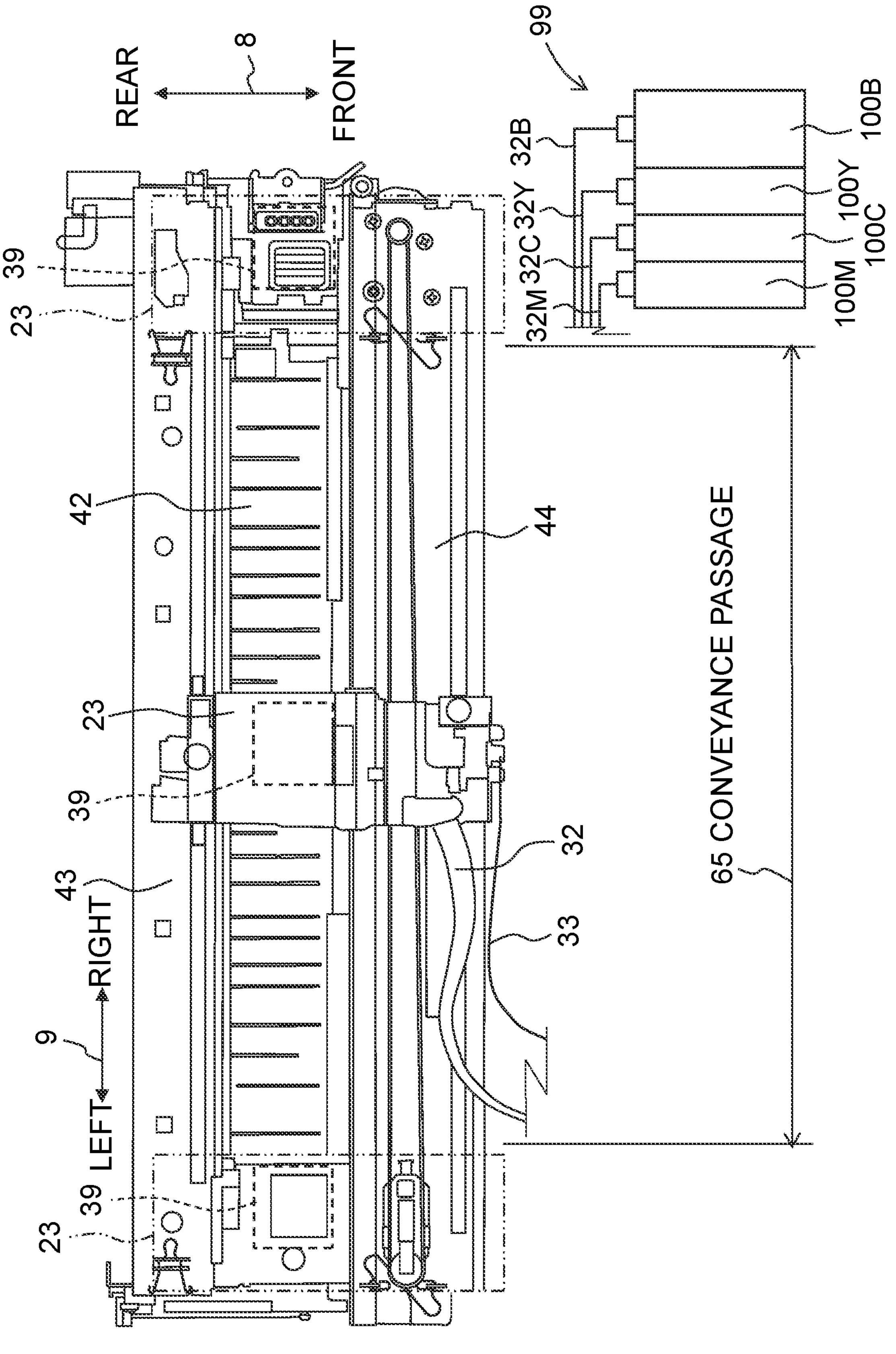
FIG. 3 is a plan view depicting an arrangement of a carriage and a tank set.

As depicted in FIG. 2, the conveyance passage 65 is the passage or route which extends to the rear portion of the printer unit 11 from the rear end portion of the feed tray 20, which makes a U-turn frontwardly while extending upwardly at the rear portion of the printer unit 11, and which passes through the space between the recording unit 24 and the platen 42 to arrive at the discharge tray 21. A part of the conveyance passage 65 is the space which is formed by an outer guide member 18 and an inner guide member 19 opposing to one another while providing a predetermined spacing distance at the inside of the printer unit 11. As depicted in FIGS. 2 and 3, the portion of the conveyance passage 65, which is disposed between the conveyance roller unit 54 and the discharge roller unit 55, is provided at an approximately central portion of the multifunction peripheral 10 in the left-right direction 9, and the portion of the conveyance passage 65 extends in the front-rear direction 8. The conveyance direction 16 of the recording paper 12 in the conveyance passage 65 is indicated by an alternate long and short dash line arrow depicted in FIG. 2.

<Conveyance Roller Unit 54>

As depicted in FIG. 2, the conveyance roller unit 54 is arranged upstream from the recording unit 24 in the conveyance direction 16. The conveyance roller unit 54 has a conveyance roller 60 and a pinch roller 61 which are opposed to one another. The conveyance roller 60 is driven by the conveyance motor. The pinch roller 61 is rotated in accordance with the rotation of the conveyance roller 60. The recording paper 12 is conveyed in the conveyance direction 16 while being interposed by the conveyance roller 60 and the pinch roller 61 which cause the forward rotation in accordance with the forward rotation of the conveyance motor.

<Discharge Roller Unit 55>

As depicted in FIG. 2, the discharge roller unit 55 is arranged downstream from the recording unit 24 in the conveyance direction 16. The discharge roller unit 55 has a discharge roller 62 and a spur 63 which are opposed to one another. The discharge roller 62 is driven by the conveyance motor. The spur 63 is rotated in accordance with the rotation of the discharge roller 62. The recording paper 12 is conveyed in the conveyance direction 16 while being interposed by the discharge roller 62 and the spur 63 which cause the forward rotation in accordance with the forward rotation of the conveyance motor.

<Recording Unit 24>

As depicted in FIG. 2, the recording unit 24 is arranged between the conveyance roller unit 54 and the discharge roller unit 55 in the conveyance direction 16. The recording unit 24 is arranged so that the recording unit 24 is opposed to the platen 42 in the up-down direction 7 while interposing the conveyance passage 65 therebetween. The recording unit

24 is provided with a carriage 23 and a recording head 39 (example of the liquid-consuming unit).

As depicted in FIG. 3, the carriage 23 is supported by guide rails 43, 44 which are provided to extend in the left-right direction 9 while being separated from each other in the front-rear direction 8. The guide rails 43, 44 are supported by the frame of the printer unit 11. The carriage 23 is connected to a known belt mechanism provided for the guide rail 44. The belt mechanism is driven by a carriage motor (not depicted). The carriage 23, which is connected to the belt mechanism, is reciprocatively movable in the left-right direction 9 in accordance with the driving of the carriage motor. As depicted by alternate long and short dash lines in FIG. 3, the range of movement of the carriage 23 extends from the conveyance passage 65 to the right and the left.

Ink tubes 32 and a flexible flat cable 33 are allowed to extend from the carriage 23.

The ink tubes 32 connect the tank set 99 and the recording head 39. The ink tubes 32 supply, to the recording head 39, inks (example of the liquid) stored in four ink tanks 100B, 100Y, 100C, 100M (generally referred to as "ink tank 100" in some cases) for constructing the tank set 99. The ink tank 100 is an example of the tank. In particular, the four ink tubes 32B, 32Y, 32C, 32M, through which the inks of black, magenta, cyan, and yellow flow, are allowed to extend from the ink tanks 100B, 100Y, 100C, 100M respectively, and they are connected to the carriage 23 in a state of being bundled. The four ink tubes 32B, 32M, 32C, 32Y are generally referred to as "ink tube 32" in some cases.

The flexible flat cable 33 electrically connects the recording head 39 and a control board on which a control unit (not depicted) is mounted. The flexible flat cable 33 transmits the control signal outputted from the control unit to the recording head 39.

As depicted in FIG. 2, the carriage 23 carries the recording head 39. A plurality of nozzles 40 are arranged on the lower surface of the recording head 39. Forward ends of the plurality of nozzles 40 are exposed from the lower surface of the recording head 39. In the following description, the surface, on which the forward ends of the nozzles 40 are exposed, is referred to as "nozzle surface". The recording head 39 discharges the inks as minute ink droplets from the nozzles 40. The recording head 39 discharges the ink droplets toward the recording paper 12 supported by the platen 42 during the process in which the carriage 23 is moved. Accordingly, an image is recorded on the recording paper 12. Further, the inks, which are stored in the ink tanks 100B, 100Y, 100C, 100M, are consumed in accordance therewith.

The printer unit 11 is provided with a maintenance mechanism (not depicted). The maintenance mechanism performs the maintenance for the recording head 39. In particular, the maintenance mechanism executes the purge operation for sucking the inks and the air contained in the nozzles 40 and the operation for removing any foreign matter or the like adhered to the nozzle surface. The inks, which are sucked from the nozzles 40 of the recording head 39, are fed by the maintenance mechanism to a waste ink tank (not depicted) via a tube (not depicted). The maintenance mechanism is arranged just under the carriage 23 which is positioned at the right or the left of the conveyance passage 65.

The carriage 23 is moved to the position disposed just over the maintenance mechanism before the purge operation is executed. After that, a cap (not depicted) of the maintenance mechanism is moved upwardly to cover the nozzle surface therewith. The cap is connected to the waste ink tank via the tube. A rotary type tube pump is arranged for the tube. The interior of the tube is in vacuum in accordance with the driving of the tube pump. Accordingly, the inks contained in the recording head 39 are sucked. The sucked inks are discharged to the waste ink tank via the cap and the tube.

Note that the tube is in a state of being plugged by the rotary type tube pump at least at one position.

<Platen 42>

As depicted in FIGS. 2 and 3, the platen 42 is arranged between the conveyance roller unit 54 and the discharge roller unit 55 in relation to the conveyance direction 16. The platen 42 is arranged so that the platen 42 is opposed to the recording unit 24 in the up-down direction 7 while interposing the conveyance passage 65 therebetween. The platen 42 supports, from the lower position, the recording paper 12 conveyed by the conveyance roller unit 54.

<Tank Set 99>

The tank set 99 stores the inks to be supplied to the recording head 39. As depicted in FIGS. 1A and 1B, the tank set 99 is provided with the four ink tanks 100B, 100Y, 100C, 100M. The inks of different colors are stored in the four ink tanks 100B, 100Y, 100C, 100M respectively. Specifically, the black ink is stored in the ink tank 100B, the yellow ink is stored in the ink tank 100Y, the cyan ink is stored in the ink tank 100C, and the magenta ink is stored in the ink tank 100M. However, the number of the ink tanks 100 and the colors of the inks are not limited to those of the foregoing example.

The four ink tanks 100B, 100Y, 100C, 100M are arranged in one array in the left-right direction 9. The left-right direction 9 is an example of the direction in which the four ink tanks are aligned. As for the four ink tanks 100B, 100Y, 100C, 100M, the ink tank 100B is arranged at the most right position, and the ink tank 100M is arranged at the most left position. Note that the arrangement positions of the ink tanks 100 are not limited to those of the example described above. The ink tank 100B for the black ink has the size, especially the width in the left-right direction 9 which is larger than those of the ink tanks 100Y, 100C, 100M for the color inks. Note that the relationship of largeness/smallness of the ink tanks 100 is not limited to that of the example described above. The ink tank 100B has an allowable storage amount of the ink as compared with those of the other ink tanks 100Y, 100C, 100M. Note that the relationship of largeness/smallness of the allowable storage amounts of the ink tanks 100 is not limited to that of the example described above.

As depicted in FIGS. 1A and 1B, the tank set 99 is set up at the right front portion at the inside of the casing 14. In other words, the tank set 99 is fixed to the multifunction peripheral 10 so that the tank set 99 cannot be easily removed from the multifunction peripheral 10. Note that the phrase "cannot be easily removed" means, for example, that the user cannot easily remove the tank set 99 from the casing 14 of the multifunction peripheral 10 in an ordinary state of use, from which such a situation is eliminated that any skilled repairer removes the tank set 99 from the casing 14 of the multifunction peripheral 10 in order to perform the repair. Therefore, it is enough that the user cannot easily remove the tank set 99 from the casing 14 of the multifunction peripheral 10 in an ordinary state of use.

Front surfaces of the respective ink tanks 100 are exposed to the outside of the multifunction peripheral 10 via an opening 22 formed at a right portion of the front wall 14A of the casing 14. The opening 22 is adjacent to the opening 13 in the left-right direction 9. The casing 14 is provided with a cover 70. The cover 70 is rotatable between a closed position (position depicted in FIG. 1A) to cover the opening 22 and an open position (position depicted in FIG. 1B) to expose the opening 22. The cover 70 has a rotating shaft (not depicted) which is disposed in the vicinity of the lower end in the up-down direction 7 and which extends in the left-right direction 9. The cover 70 is supported by the casing 14 so that the cover 70 is rotatable about a rotation axis 70A of the rotating shaft.

The structures of the ink tanks 100 will be explained in detail below. The structures of the ink tanks 100Y, 100C, 100M for the color inks are identical to one another. Therefore, in the following description, one of the ink tanks 100Y, 100C, 100M is referred to as "ink tank 100", and the structure thereof will be explained. Further, the structure of the ink tank 100B for the black ink is similar to the structures of the ink tanks 100Y, 100C, 100M. Therefore, the structure of the ink tank 100B will be explained about portions different from those of the ink tanks 100Y, 100C, 100M after the explanation about the structures of the ink tanks 100Y, 100C, 100M. In this case, even when the shapes differ to some extent in relation to the structure of the ink tank 100B and the structures of the ink tanks 100Y, 100C, 100M, the same reference numerals are affixed to the structural components having the same or equivalent functions. Note that in the following explanation, the multifunction peripheral 10 and the ink tanks 100 set up for the multifunction peripheral 10 are in the usable attitude, unless otherwise stated.

<Ink Tank 100>

Figure 4:
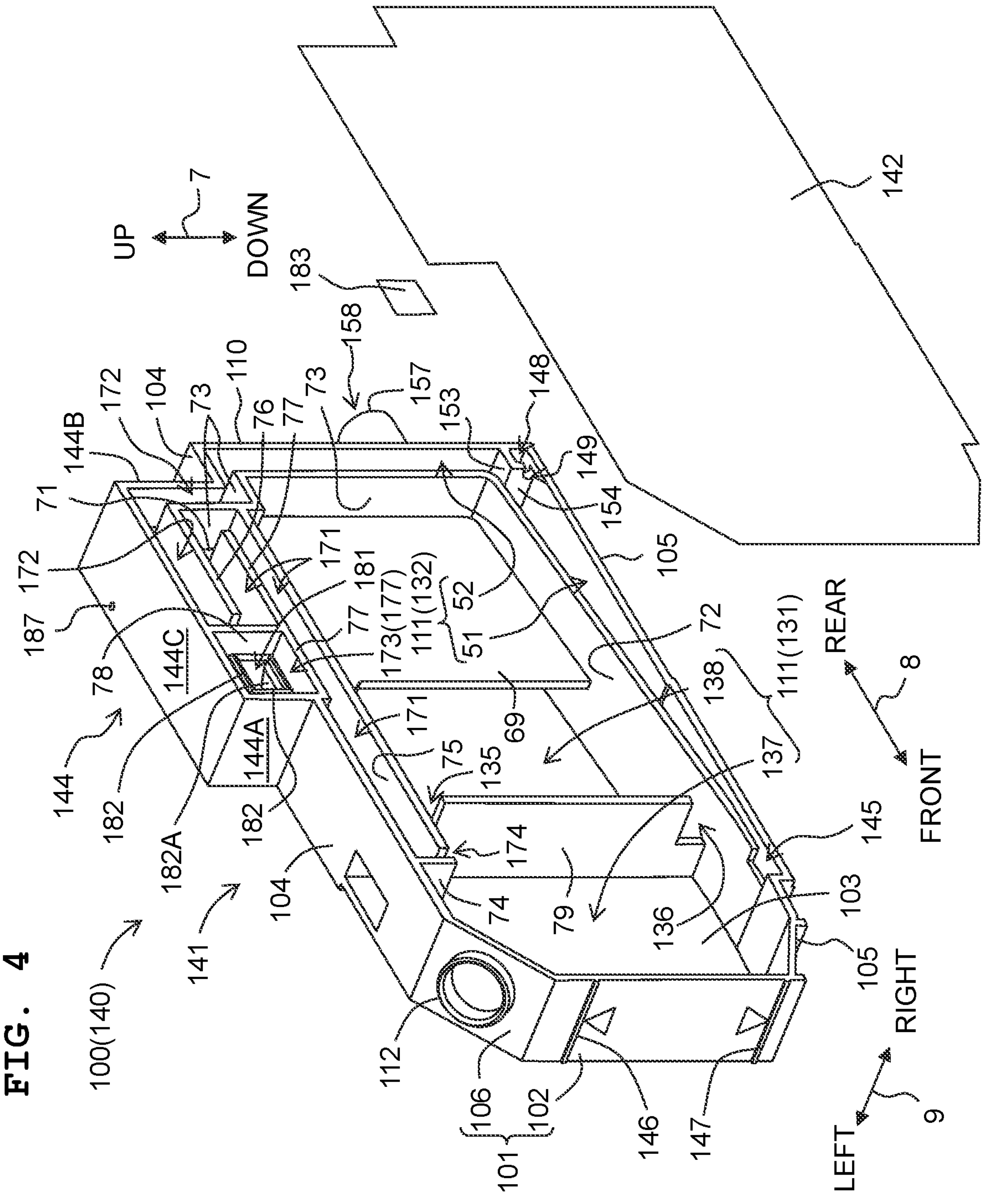
FIG. 4 is a front perspective view of an ink tank for a color ink.
Figure 5:
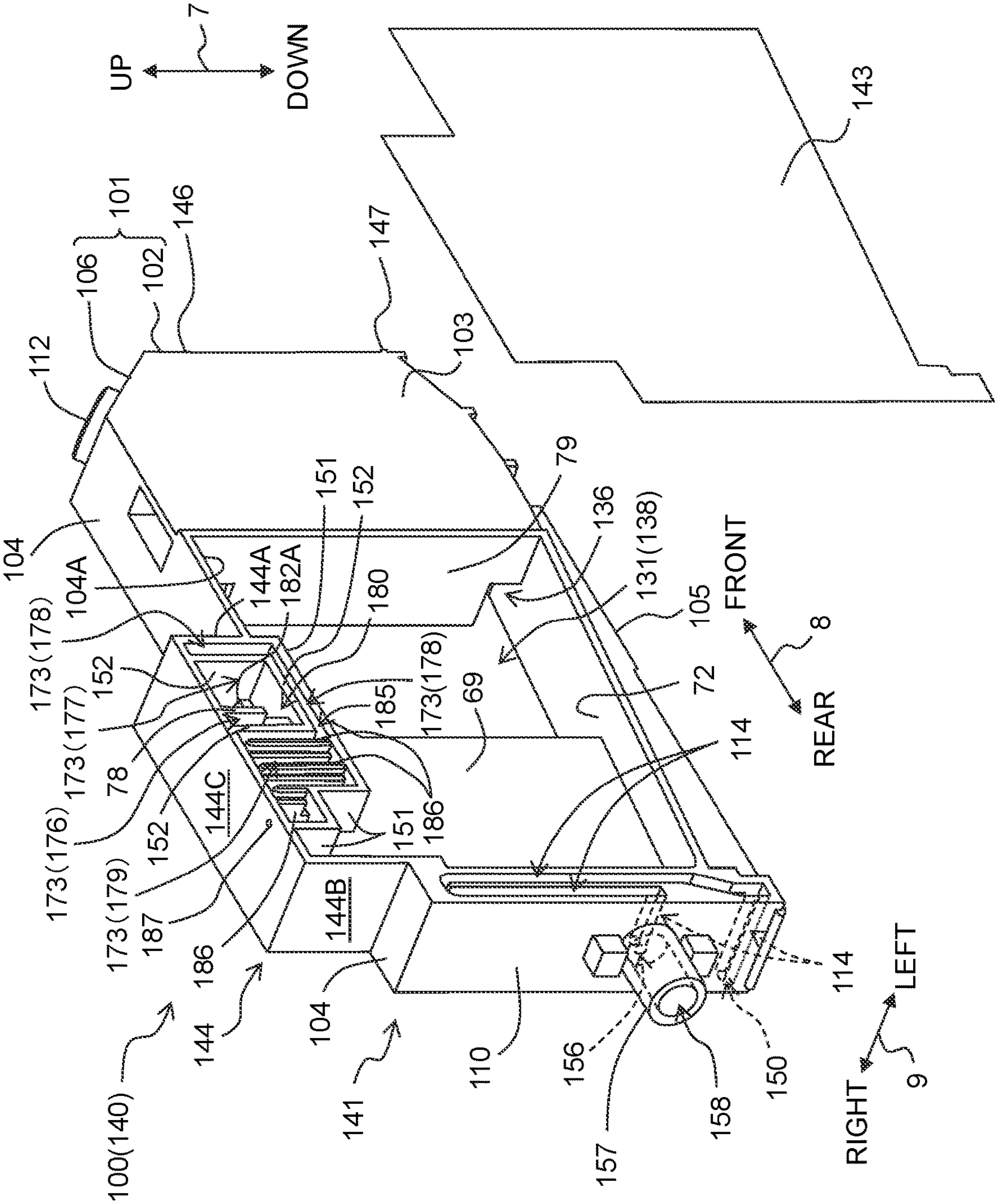
FIG. 5 is a rear perspective view of the ink tank for the color ink.

As depicted in FIGS. 4 and 5, the ink tank 100 is constructed by a casing 140 which forms the outer shape of the ink tank. The casing 140 is provided with a frame 141 and two films 142, 143.

The frame 141 has such a flat rectangular parallelepiped shape as a whole that the dimension in the left-right direction 9 is short and the dimensions in the up-down direction 7 and the front-rear direction 8 are longer than the dimension in the left-right direction 9. Further, the dimension in the front-rear direction 8 is longer than the dimension in the up-down direction 7. In other words, the ink tank 100 has a first side which extends in the front-rear direction 8, a second side which is shorter than the first side and which extends in the up-down direction 7, and a third side which is shorter than the second side and which extends in the left-right direction 9.

The frame 141 is formed of a resin which has a light-transmissive (transparent) property to such an extent that the ink contained in an ink chamber 111 described later on is visually recognizable from the outside of the ink tank 100. The frame 141 is formed of, for example, polypropylene. The frame 141 is integrally molded, for example, by performing the injection molding with a resin material. The rigidity of the frame 141 is higher than the rigidities of the films 142, 143.

Note that the frame 141 may be composed of any material other than the resin. Further, the frame 141 may be constructed such that a plurality of members are combined. For example, a first ink chamber 131 and a second ink chamber 132 described later on may be constructed by two casings which are distinct from each other, and the two casing may be connected by a tube or the like.

The frame 141 is provided with a front wall 101, a left wall 103, an upper wall 104, a lower wall 105, a rear wall 110, and inner walls 69, 71 to 79, 151 to 155.

The front wall 101 is constructed by an upstanding wall 102 and an inclined wall 106. The upstanding wall 102 spreads in the up-down direction 7 and the left-right direction 9. The inclined wall 106 is the wall which connects the upper end of the upstanding wall 102 and the front end of the upper wall 104, and the inclined wall 106 is inclined with respect to the up-down direction 7 and the front-rear direction 8.

The left wall 103 is the wall which extends rearwardly from the left end of the front wall 101. The upper end of the left wall 103 is connected to a front portion of the upper wall 104. The lower end of the left wall 103 is connected to a front portion of the lower wall 105. In other words, the left wall 103 is the wall which connects the left end of the front wall 101, the left end of the front portion of the upper wall 104, and the left end of the front portion of the lower wall 105. In other words, the left wall 103 is provided at only the front portion of the frame 141, and the left wall 103 is not provided at the rear portion of the frame 141.

The upper wall 104 extends rearwardly from the upper end of the front wall 101 (rear end of the inclined wall 106). The front portion of the upper wall 104 is connected to the upper end of the left wall 103. A protrusion 144, which protrudes upwardly, is formed from an approximately central portion to the rear portion in the front-rear direction 8 of the upper wall 104. The protrusion 144 is provided with a front wall 144A which protrudes upwardly from an approximately central portion in the front-rear direction 8 of the upper wall 104, a rear wall 144B which protrudes upwardly from the rear portion of the upper wall 104, and an upper wall 144C which connects the upper end of the front wall 144A and the upper end of the rear wall 144B.

The lower wall 105 is the wall which extends rearwardly from the lower end of the front wall 101. The lower wall 105 is formed while being separated downwardly from the upper wall 104. As described above, the front portion of the lower wall 105 is connected to the lower end of the left wall 103. The left end portion of the lower wall 105 is bent upwardly. The upper end of the bent lower wall 105 is connected to the lower surface of an inner wall 72 described later on (see FIG. 5).

The rear wall 110 is formed while being separated rearwardly from the front wall 101 in the front-rear direction 8. As described above, the upper end of the rear wall 110 is connected to the rear end of the upper wall 104. The lower end of the rear wall 110 is connected to the rear end of the lower wall 105. The left portion of the rear wall 110 is positioned rearwardly as compared with the right portion of the rear wall 110. An ink outflow passage 114 described later on is formed at the left portion of the rear wall 110.

Figure 6:
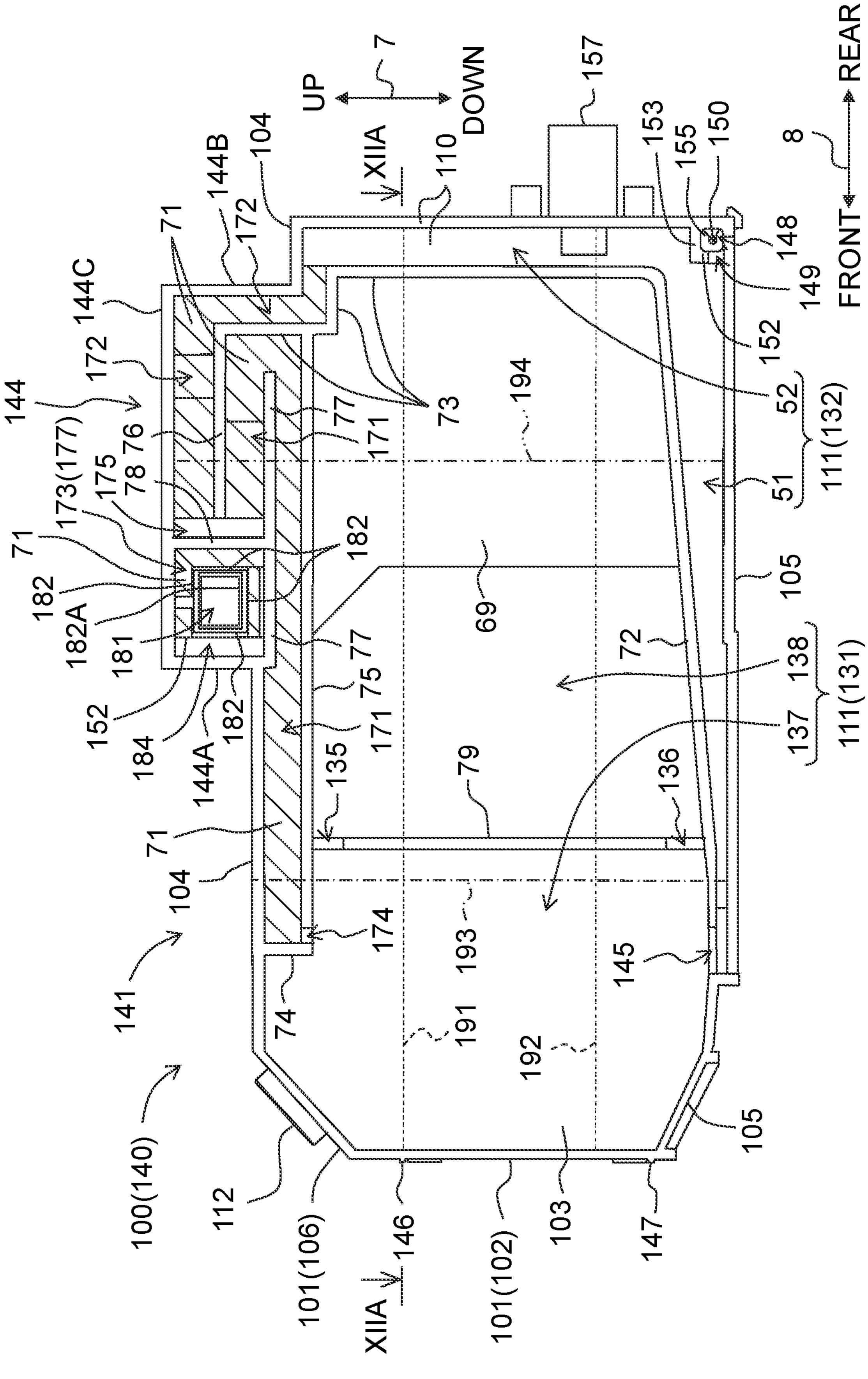
FIG. 6 is a right side view of the ink tank for the color ink.
Figure 7:
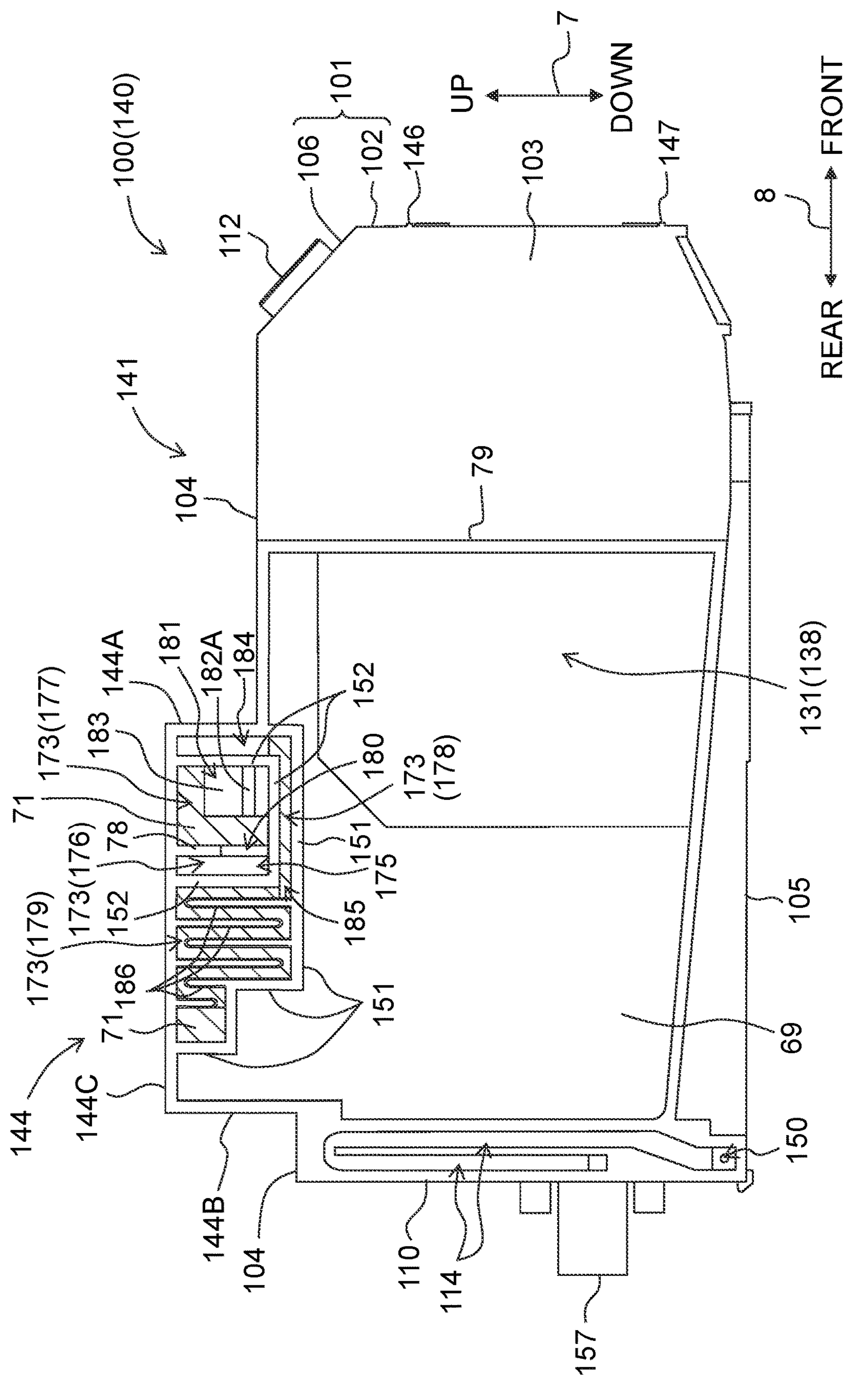
FIG. 7 is a left side view of the ink tank for the color ink.

As depicted in FIGS. 6 and 7, the inner wall 71 extends downwardly from the upper wall 104 and the upper wall 144C of the protrusion 144. The inner wall 71 is the wall which spreads in the up-down direction 7 and the front-rear direction 8. The inner wall 71 is provided within a range of hatching depicted in FIGS. 6 and 7. The inner wall 71 is provided at a position between the right end and the left end of the frame 141 in relation to the left-right direction 9. For example, the inner wall 71 is provided at an approximately central portion of the frame 141 in relation to the left-right direction 9. Accordingly, the interior of the frame 141 is divided into the left and the right at the portion at which the inner wall 71 is provided. Further, the inner wall 71 may be provided at a position near to the right end of the frame 141 and a position near to the left end of the frame 141 in relation to the left-right direction 9. Note that it is desirable that the inner wall 71 is provided at a position at which the right end and the left end of the frame 141 are not included in order to prescribe a part of a communication passage described later on.

As depicted in FIGS. 4 and 5, the inner wall 72 is provided in the vicinity of the lower wall 105 between the upper wall 104 and the lower wall 105 in relation to the up-down direction 7. The inner wall 72 extends rearwardly while being inclined upwardly from the front end portion to the rear end portion of the lower wall 105. The front end of the inner wall 72 is connected to a portion of the lower wall 105 disposed on the front end portion side. The rear end of the inner wall 72 is positioned frontwardly from the rear wall 110 while being separated from the rear wall 110.

The inner wall 73 extends generally upwardly from the rear end of the inner wall 72 while maintaining a constant spacing distance with respect to the rear wall 110. The inner wall 73 extends up to the inside of the protrusion 144, while being bent along the outer shape of the protrusion 144. The upper end of the inner wall 73 is positioned while being separated from the upper wall 144C under or below the upper wall 144C of the protrusion 144. A part of the inner wall 73 (portion disposed under or below the inner wall 75 described later on) extends from the right end to the left end of the frame 141. On the other hand, the other portions of the inner wall 73 extend from the right end of the frame 141 to the inner wall 71.

The inner wall 69 spreads in the up-down direction 7 and the front-rear direction 8. The inner wall 69 is positioned between the inner wall 72 and the inner wall 75 described later on in relation to the up-down direction 7. The inner wall 69 is positioned in front of the inner wall 73. The inner wall 69 is provided at an approximately central portion of the frame 141 in relation to the left-right direction 9. Accordingly, a rear ink chamber 138 of the first ink chamber 131 described later on is divided into the left and the right at the portion at which the inner wall 69 is provided. The lower end of the inner wall 69 is connected to the rear portion of the inner wall 72. The upper end of the inner wall 69 is connected to the rear portion of the inner wall 75. The rear end of the inner wall 69 is connected to the inner wall 73.

The inner walls 74 to 77 explained below extend rightwardly from the inner wall 71 (see FIG. 6). In other words, the inner walls 74 to 77 extend from the inner wall 71 to the right end of the frame 141.

As depicted in FIGS. 4 to 6, the inner wall 74 extends downwardly at a front portion of a lower surface 104A of the upper wall 104. The left end of the inner wall 74 is connected to the left wall 103. The rear surface of the inner wall 74 is connected to the front end of the inner wall 71.

The inner wall 75 extends rearwardly from the lower end of the inner wall 74. The rear end of the inner wall 75 is connected to the inner wall 73.

The inner wall 76 extends frontwardly from the upper end of the inner wall 73. In other words, the inner wall 76 is positioned upwardly as compared with the inner wall 75. The front end of the inner wall 76 is positioned rearwardly as compared with a through-hole 176 described later on.

The inner wall 77 extends rearwardly from the lower end of the front wall 144A of the protrusion 144. The front portion of the inner wall 77 is positioned between the inner wall 75 and the upper wall 144C of the protrusion 144 in relation to the up-down direction 7, and the front portion of the inner wall 77 is opposed to the upper wall 144C of the protrusion 144C and the inner wall 75 in the up-down direction 7. The rear portion of the inner wall 77 is positioned between the inner wall 76 and the inner wall 75 in relation to the up-down direction 7, and the rear portion of the inner wall 77 is opposed to the inner wall 76 and the inner wall 75 in the up-down direction 7. The rear end of the inner wall 77 is positioned in front of the inner wall 73 while being separated from the inner wall 73.

The inner walls 78, 79 explained below extend rightwardly and leftwardly from the inner wall 71 (see FIGS. 6 and 7). In other words, the inner walls 78, 79 extend from the right end to the left end of the frame 141.

As depicted in FIGS. 4 and 5, the inner wall 78 spreads in the up-down direction 7 and the left-right direction 9. The inner wall 73 is provided while being separated from the front wall 144A at the rear of the front wall 144A of the protrusion 144. As depicted in FIG. 6, the inner wall 78 is opposed to the inner wall 76 while interposing the through-hole 175 in relation to the front-rear direction 8. In other words, the inner wall 78 is provided between the front wall 144A and the through-hole 175 in relation to the front-rear direction 8.

The inner wall 79 spreads in the up-down direction 7 and the left-right direction 9. The inner wall 79 is positioned rearwardly from the inner wall 74 and frontwardly from the inner wall 69. The upper end of the inner wall 79 is connected to the inner wall 75. The lower end of the inner wall 79 is connected to the inner wall 72. The left end of the inner wall 79 is connected to the left wall 103.

The inner walls 151, 152 explained below extend leftwardly from the inner wall 71 (see FIG. 7). In other words, the inner walls 151, 152 extend from the inner wall 71 to the left end of the frame 141.

As depicted in FIGS. 5 and 7, the inner wall 151 is the wall which connects the lower end of the front wall 144A of the protrusion 144 and the rear portion of the upper wall 144C of the protrusion 144. The inner wall 151 extends rearwardly from the lower end of the front wall 144A, the inner wall 151 subsequently extends upwardly, the inner wall 151 subsequently extends rearwardly, the inner wall 151 subsequently extends upwardly, and the inner wall 151 arrives at the upper wall 144C.

The inner wall 152 is the wall which connects two portions of the upper wall 144C of the protrusion 144. The two portions are the front end portion of the upper wall 144C and the central portion in the front-rear direction 8 of the upper wall 144C. The inner wall 152 extends downwardly from the lower surface of the front end portion of the upper wall 144C, the inner wall 152 subsequently extends rearwardly, the inner wall 152 subsequently extends upwardly, and the inner wall 152 arrives at the lower surface of the central portion in the front-rear direction 8 of the upper wall 144C. The inner wall 152 is surrounded by the upper wall 144C and the inner wall 151, when the ink tank 100 is viewed from the left.

As depicted in FIG. 4, the right surface of the frame 141 is open. The right surface of the frame 141 is sealed by welding the film 142 to the right surfaces of the front wall 101, the lower wall 105, the rear wall 110, the upper wall 104, the inner walls 72 to 79, the front wall 144A of the protrusion 144, the rear wall 144B of the protrusion 144, and the upper wall 144C of the protrusion 144.

As depicted in FIG. 5, the rear portion of the left surface of the frame 141 is open. The left surface of the frame 141 is sealed by welding the film 143 to the left surfaces of the rear wall 110, the upper wall 104, the inner wall 72, the inner wall 79, the inner wall 151, the inner wall 152, the front wall 144A of the protrusion 144, the rear wall 144B of the protrusion 144, the upper wall 144C of the protrusion 144, and a partition wall 186 described later on.

As depicted in FIG. 4, the outer surface (front surface) of the upstanding wall 102 of the front wall 101 is provided with a first line 146 and a second line 147.

The first line 146 extends in the left-right direction 9. The position in the up-down direction 7 of the first line 146 resides in the same height as that of the liquid surface of the ink when the ink, which is in a permitted maximum amount (example of the first amount), is stored in the ink chamber 111 in the usable attitude of the multifunction peripheral 10. Note that the position in the up-down direction 7 of the first line 146 is not limited to the same height as that of the liquid surface of the ink when the ink in the maximum amount is stored in the ink chamber 111.

The second line 147 extends in the left-right direction 9. The second line 147 is positioned downwardly from the first line 146. In particular, the position in the up-down direction 7 of the second line 147 resides in the same height as that of the liquid surface of the ink when the ink, which is in an amount smaller than the maximum amount described above, is stored in the ink chamber 111 when the ink tank 100 is in the usable attitude. In this embodiment, the position in the up-down direction 7 of the second line 147 resides in the same height as that of the liquid surface of the ink when the ink in a minimum storage amount, for which the supplement with the ink is required, is stored in the ink chamber 111 when the ink tank 100 is in the usable attitude.

<Ink Chamber 111>

As depicted in FIGS. 4 and 5, the ink chamber 111 (example of the liquid storage chamber) is formed at the inside of the casing 140. The ink chamber 111 is the internal space of the ink tank 100, in which the ink is stored. The ink chamber 111 is provided with a first ink chamber 131 and a second ink chamber 132.

The first ink chamber 131 is provided with a space described below, and the first communication passage 171 which is the atmosphere communication passage communicated with the space. The second ink chamber 132 is provided with a space described below, a second communication passage 172 which is the atmosphere communication passage communicated with the space, a buffer chamber 143, and an ink outflow passage 114. The atmosphere communication passage, the buffer chamber 148, and the ink outflow passage 114 will be described later on.

The first ink chamber 131 is defined by the front wall 101, the left wall 103, the lower wall 105, the rear wall 110, the inner wall 72, the inner wall 73, the inner wall 74, the inner wall 75, the upper wall 104, the inner wall 151, the upper wall 144C of the protrusion 144, the film 142, and the film 143. The front wall 101 defines the front surface of the first ink chamber 131. The lower wall 105 and the inner wall 72 define the lower surface of the first ink chamber 131. The inner wall 73 defines the rear surface of the first ink chamber 131. The inner wall 75, the inner wall 74, and the upper wall 104 define the upper surface of the first ink chamber 131. The film 142 defines the right surface of the first ink chamber 131. The left wall 103 and the film 143 define the left surface of the first ink chamber 131.

The first ink chamber 131 is divided into a front ink chamber 137 and a rear ink chamber 138 by the inner wall 79. The front surface of the inner wall 79 defines the rear surface of the front ink chamber 137. The rear surface of the inner wall 79 defines the front surface of the rear ink chamber 138.

The upper end portion of the inner wall 79 is cut out leftwardly from the right end. Accordingly, an opening 135 is formed at the upper end portion of the inner wall 79. The opening 135 is defined by the inner wall 79, the inner wall 75, and the film 142. The lower end portion of the inner wall 79 is cut out leftwardly from the right end. Accordingly, an opening 136 is formed at the lower end portion of the inner wall 79. The opening 136 is defined by the inner wall 79, the inner wall 72, and the film 142. The front ink chamber 137 and the rear ink chamber 138 are communicated with each other by the openings 135, 136.

As depicted in FIGS. 4 and 6, the second ink chamber 132 is positioned downwardly and rearwardly from the first ink chamber 131. The second ink chamber 132 generally has an L-shaped form when the ink tank 100 is viewed from the left. The second ink chamber 132 is provided with a lower ink chamber 51 and an upper ink chamber 52. The lower ink chamber 51 is positioned under or below the first ink chamber 131. The upper ink chamber 52 extends upwardly from the rear end portion of the lower ink chamber 51. The upper ink chamber 52 is positioned at the rear of the rear ink chamber 138 of the first ink chamber 131.

The lower ink chamber 51 is defined by the lower wall 105, the inner wall 72, and the film 142. The lower wall 105 defines the front surface, the lower surface, and the left surface of the lower ink chamber 51. The inner wall 72 defines the upper surface of the lower ink chamber 51. The film 142 defines the right surface of the lower ink chamber 51. The rear end of the lower ink chamber 51 is open. The lower ink chamber 51 is communicated with the upper ink chamber 52 at the rear end.

The front end portion of the inner wall 72 is cut out leftwardly from the right end. Accordingly, an opening 145 is formed at the front end portion of the inner wall 72. The opening 145 is defined by the inner wall 72, the lower wall 105, and the film 142. The front ink chamber 137 of the first ink chamber 131 and the lower ink chamber 51 of the second ink chamber 132 are communicated with each other by the opening 145.

The upper ink chamber 52 is defined by the rear wall 110, the inner wall 73, and the film 142. The rear wall 110 defines the rear surface and the left surface of the upper ink chamber 52. The inner wall 73 defines the front surface of the upper ink chamber 52. The film 142 defines the right surface of the upper ink chamber 52. The lower end of the upper ink chamber 52 is open. The upper ink chamber 52 is communicated with the lower ink chamber 52 at the lower end.

The upper end of the upper ink chamber 52 is open. In this case, the upper end (virtual surface) has the same height as that of the first line 146. In other words, the upper end has the same height as that of the liquid surface of the ink when the ink, which is in the permitted maximum amount, is stored in the ink chamber 111 in the usable attitude of the ink tank 100. Then, the upper ink chamber 52 is communicated at the upper end with the second communication passage 172 of the atmosphere communication passage described later on. That is, the upper end is the boundary between the upper ink chamber 52 and the second communication passage 172. Note that the boundary is not limited to the position described above, which may be disposed over or above or under or below the first line 146.

Figure 12A:
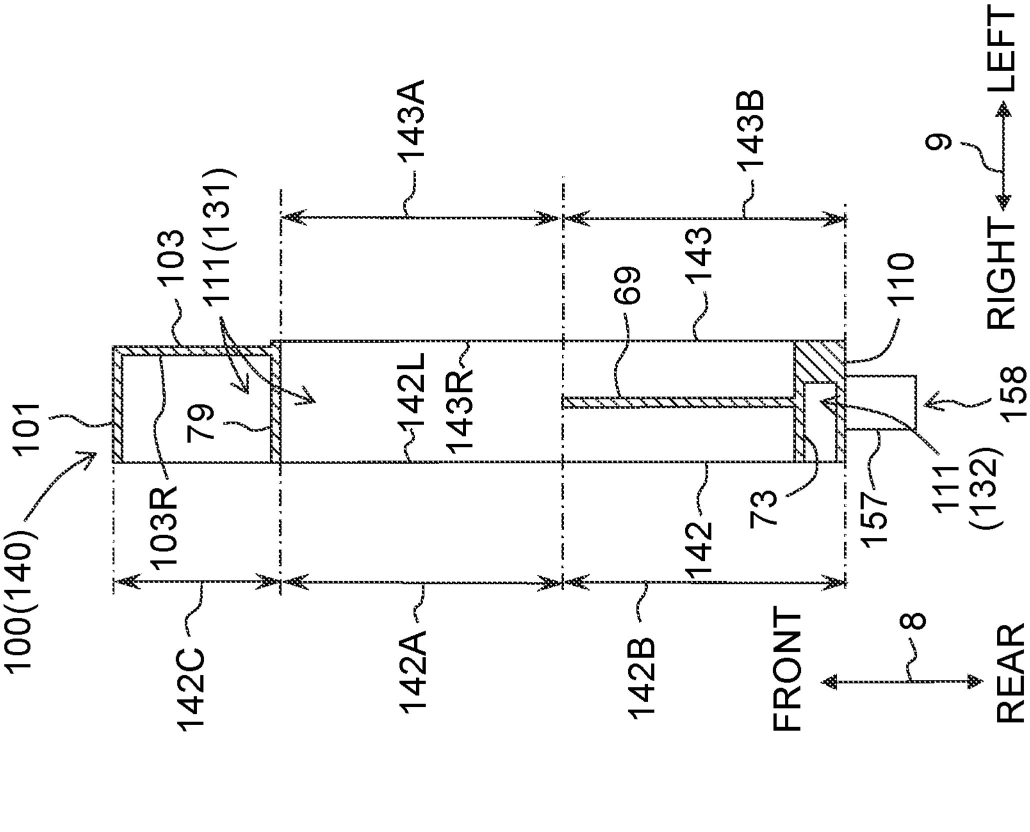
FIG. 12A is a schematic view of a cross section taken along XIIA-XIIA of FIG. 6.

The right surface of the ink chamber 111 is defined by the left surface 142L of the film 142 (see FIG. 12A). In other words, the entire right surface of the ink chamber 111 is constructed by the film 142. Further, the left surface of the ink chamber 111 is defined by the right surface 143R of the film 143 and the right surface 103R of the left wall 103 (see FIG. 12A). In other words, a part of the left surface of the ink chamber 111 is constructed by the film 143. The right surface and the left surface of the ink chamber 111 are examples of the two surfaces.

Note that the right surface of the ink chamber 111 may be defined by the film 142 and the wall. In other words, a part of the right surface of the ink chamber 111 may be constructed by the film 142. Further, the left surface of the ink chamber 111 may be defined by only the film 143. In other words, the entire left surface of the ink chamber 111 may be constructed by the film 143.

Further, it is not necessarily indispensable that the right surface and the left surface of the ink chamber 111 are flush with each other. For example, as depicted in FIG. 12A, the right surface 143R of the film 143 is positioned leftwardly from the right surface 103R of the left wall 103 in the state in which the film 143 is welded. In other words, there is a difference in height between the right surface 143R of the film 143 and the right surface 103R of the left wall 103. Also in this case, the second surface is composed of the right surface 143R of the film 143 and the right surface 103R of the left wall 103. In other words, the second surface is constructed by a plurality of flat surfaces each having a difference in height.

The right surface and the left surface of the ink chamber 111 are opposed to one another in a state of being separated from each other. In other words, the right surface and the left surface of the ink chamber 111 are mutually opposing surfaces.

In this embodiment, a part of the film 142 for constructing the right surface of the ink chamber 111 and a part of the film 143 for constructing the left surface of the ink chamber 111 are opposed to one another.

Specifically, as depicted in FIG. 12A, the portion of the film 142 which is disposed rearwardly from the inner wall 79 and frontwardly from the inner wall 69 and the portion of the film 143 which is disposed frontwardly from the inner wall 69 are opposed to one another without any other member intervening therebetween. In other words, the central portion 142A in the front-rear direction 8 of the film 142 and the central portion 143A in the front-rear direction 8 of the film 143 are opposed to one another without any other member intervening therebetween.

Further, the rear portion 142B of the film 142 and the rear portion 143B of the film 143 are opposed to one another in a state in which the inner wall 69 intervenes therebetween.

Note that the member, which is opposed to the front portion 142C of the film 142 on the left surface of the ink chamber 111, is not the film 143 but the left wall 103. In other words, the front portion 142C of the film 142 is not opposed to the film 143.

As described above, the phrase "the part of the film 142 and the part of the film 143 are opposed to one another" means that the films are mutually opposed to one another.

Any one of the right surface and the left surface of the ink chamber 111 is the surface which spreads in the front-rear direction 8 and the up-down direction 7. In other words, each of the right surface and the left surface of the ink chamber 111 has a first side which extends in the front-rear direction 8 and a second side which extends in the up-down direction 7. Further, any one of the right surface and the left surface of the ink chamber 111 is the surface which spreads in the front-rear direction 8 and the up-down direction 7. Therefore, the right surface and the left surface of the ink chamber 111 are parallel to one another. The front-rear direction 8 is an example of the direction which intersects the predetermined direction. Note that it is also allowable that the right surface and the left surface of the ink chamber 111 are not parallel to one another. For example, the right surface of the ink chamber 111 may be inclined with respect to the left surface of the ink chamber 111.

The liquid surface of the ink is indicated by a broken line 191 depicted in FIG. 6 when the ink, which is in the permitted maximum amount, is stored in the ink chamber 111 in the usable attitude of the ink tank 100, in other words, in the state in which the upper wall 104 is positioned at the upper portion of the ink tank 100 and the lower wall 105 is positioned at the lower portion of the ink tank 100. In other words, the liquid surface of the ink is at the same height as that of the first line 146 as described above.

In this situation, the height in the vertical direction (height in the up-down direction 7) of the liquid surface of the ink stored in the first ink chamber 131 is the same as the height in the vertical direction (height in the up-down direction 7) of the liquid surface of the ink stored in the second ink chamber 132.

Further, in this situation, the liquid surface of the ink in the first ink chamber 131 and the liquid surface of the ink in the second ink chamber 132 are formed independently from each other. Specifically, the liquid surface of the ink in the first ink chamber 131 is surrounded by the front wall 101, the inner wall 73, the film 142, the left wall 103, and the film 143. On the other hand, the liquid surface of the ink in the second ink chamber 132 is surrounded by the rear wall 110, the inner wall 73, and the film 142.

Note that the situation, in which the liquid surface of the ink in the first ink chamber 131 and the liquid surface of the ink in the second ink chamber 132 are formed independently from each other, is not necessarily provided when the ink, which is in the permitted maximum amount, is stored in the ink chamber 111. For example, the situation, in which the liquid surface of the ink in the first ink chamber 131 and the liquid surface of the ink in the second ink chamber 132 are formed independently from each other, may be provided when the liquid surface of the ink stored in the ink chamber 111 has the same height as that of the second line 147. Of course, the liquid surface of the ink in the first ink chamber 131 and the liquid surface of the ink in the second ink chamber 132 may be formed independently from each other when the ink, which is in the permitted maximum amount, is stored in the ink chamber 111, when the liquid surface of the ink stored in the ink chamber 111 has the same height as that of the second line 147, and/or when the ink, which is in any other amount, is stored.

Further, even when the ink tank 100 is not in the usable attitude, the liquid surface of the ink in the first ink chamber 131 and the liquid surface of the ink in the second ink chamber 132 are formed independently from each other.

For example, the position of the liquid surface of the ink is indicated by a broken line 192 depicted in FIG. 6, when the ink, which is in the permitted maximum amount, is stored in the ink chamber 111 in the state in which the lower wall 105 is positioned at the upper portion of the ink tank 100 and the upper wall 104 is positioned at the lower portion of the ink tank 100. That is, the position of the liquid surface of the ink is disposed at the position of the broken line 192 indicated between the first line 146 and the second line 147 in the up-down direction 7.

Further, for example, the position of the liquid surface of the ink is indicated by an alternate long and short dash line 193 depicted in FIG. 6, when the ink, which is in the permitted maximum amount, is stored in the ink chamber 111 in the state in which the front wall 101 is positioned at the upper portion of the ink tank 100 and the rear wall 110 is positioned at the lower portion of the ink tank 100.

Further, for example, the position of the liquid surface of the ink is indicated by an alternate long and short dash line 194 depicted in FIG. 6, when the ink, which is in the permitted maximum amount, is stored in the ink chamber 111 in the state in which the rear wall 110 is positioned at the upper portion of the ink tank 100 and the front wall 101 is positioned at the lower portion of the ink tank 100.

<Buffer Chamber 148>

As depicted in FIGS. 4 and 6, the buffer chamber 148 is formed at the inside of the casing 140. The buffer chamber 148 is the internal space of the ink tank 100, and the buffer chamber 148 intervenes between the second ink chamber 132 and the ink outflow passage 114 described later on. That is, the ink, which is stored in the second ink chamber 132, flows into the ink outflow passage 114 via the buffer chamber 148.

The buffer chamber 148 is provided on the right side of a rear lower portion of the casing 140. The buffer chamber 148 is defined by the inner wall 153, the inner wall 154, the inner wall 155, the lower wall 105, the rear wall 110, and the film 142.

The inner wall 153 protrudes frontwardly from the front surface of the right lower portion of the rear wall 110, and the inner wall 153 extends in the left-right direction 9. The inner wall 153 defines the upper surface of the buffer chamber 148. The inner wall 154 protrudes upwardly from the upper surface of the right rear portion of the lower wall 105, and the inner wall 154 extends in the left-right direction 9. The inner wall 154 defines the front wall of the buffer chamber 148. The inner wall 155 is the wall which spreads in the up-down direction 7 and the front-rear direction 8, and the inner wall 155 is surrounded by the inner wall 153, the inner wall 154, the rear wall 110, and the lower wall 105. The inner wall 155 defines the left surface of the buffer chamber 148. The lower wall 105 defines the lower surface of the buffer chamber 148. The rear wall 110 defines the rear surface of the buffer chamber 148. The film 142 defines the right surface of the buffer chamber 148.

The right lower end portion of the inner wall 154 is cut out leftwardly from the right end. Accordingly, an opening 149 is formed at the right lower end portion of the inner wall 154. The opening 149 is defined by the inner wall 154 and the film 142. The opening 149 makes the communication between the buffer chamber 148 and the right side of the rear lower portion of the second ink chamber 132. Note that in this embodiment, the inner wall 154 is cut out to have a semicircular shape. However, the shape of the cutout is not limited to the semicircular shape, which may be, for example, a rectangular shape.

A circular opening 150 is formed at the central portion of the inner wall 155. The opening 150 makes communication between the buffer chamber 148 and the ink outflow passage 114. The ink, which is stored in the second ink chamber 132, flows into the opening 150 via the buffer chamber 148. In other words, the opening 150 is the ink inflow port (example of the liquid inflow port) which is provided in order that the ink is allowed to flow from the buffer chamber 148 into the ink outflow passage 114. Note that the shape of the opening 150 is not limited to the circular shape, which may be, for example, a rectangular shape.

A part of the opening 149 is defined by the film 142. On this account, the meniscus is not formed stably for the opening 149. In this embodiment, the inner wall 155 is provided, and the opening 150 is formed for the inner wall 155. The entire circumferential edge of the opening 150 is defined by the inner wall 155. Therefore, the stable meniscus pressure resistance arises in the opening 150. Accordingly, the meniscus is formed stably for the opening 150. As a result, even when the ink tank 100 is in any attitude or posture, it is possible to prevent the bubble from entering the ink outflow passage 114 explained below.

<Ink Outflow Passage 114>

As depicted in FIGS. 5 and 7, the casing 140 has the ink outflow passage 114. The ink outflow passage 114 is the communication passage which is provided in order that the ink, which is stored in the second ink chamber 132, is allowed to flow out to the outside of the ink tank 100. Note that in this embodiment, the ink, which is stored in the first ink chamber 131, is moved to the second ink chamber 132 via the opening 145. Therefore, the ink outflow passage 114 is also referred to as the communication passage which is provided in order that the ink, which is stored in the first ink chamber 131 and the second ink chamber 132, is allowed to flow out to the outside of the ink tank 100.

The ink outflow passage 114 is communicated with the buffer chamber 148 via the opening 150. The ink outflow passage 114 extends leftwardly from the opening 150, the ink outflow passage 114 subsequently extends upwardly, the ink outflow passage 114 subsequently extends downwardly, the ink outflow passage 114 subsequently extends rightwardly, and the ink outflow passage 114 arrives at the opening 156.

The ink outflow passage 114 is formed as the groove which is recessed rightwardly from the left surface of the rear wall 110. Portions of the ink outflow passage 114, from which a part of the right surface and the left surface are excluded, are defined by the rear wall 110. The portion of the right surface of the ink outflow passage 114, which is disposed around the opening 156, is defined by the inner wall 155. The left surface of the ink outflow passage 114 is defined by the film 143.

The frame 141 is provided with a cylindrical protruding portion 157. The protruding portion 157 protrudes rearwardly from the surrounding portion of the opening 156 of the rear wall 110. The front end of the internal space of the protruding portion 157 is communicated with the ink outflow passage 114 via the opening 156. The rear end of the internal space of the protruding portion 157 is communicated with the outside of the ink tank 100 by means of the opening 158. The ink tube 32 is connected to the protruding portion 157 via the opening 158.

As described above, one end of the ink outflow passage 114 is communicated with the second ink chamber 132 via the buffer chamber 148. Further, the other end of the ink outflow passage 114 is communicated with the nozzles 40 of the recording head 39 via the internal space of the protruding portion 157 and the ink tube 32. In other words, the ink, which flows in from the opening 150, flows out from the opening 158 toward the recording head 39. Further, when the ink is consumed in accordance with the discharge of the ink droplets from the recording head 39, the ink, which is contained in the ink outflow passage 114, is moved toward the recording head 39.

In this context, the ink outflow passage 114 is the flow passage. The flow passage is the space which has one end connected to the ink chamber 111, wherein the ink, which is stored in the ink chamber 111, does not flow into the space irrelevant to the attitude or posture of the ink tank 100 when the other end is closed. In this embodiment, the ink tank 100 is provided with only the ink outflow passage 114 as the flow passage. However, the ink tank 100 may be provided with any flow passage other than the ink outflow passage 114.

As described above, the tube, which extends from the cap of the maintenance mechanism capable of covering the nozzles 40 of the recording head 39, is closed or clogged by the pump. Therefore, when the nozzles 40 are covered with the cap, the other end of the ink outflow passage 114 (end deviated toward the protruding portion 157) is communicated with the closed tube via the internal space of the protruding portion 157, the ink tube 32, the recording head 39, and the cap. In other words, the other end of the ink outflow passage 114 is closed. Then, the cross-sectional area of the ink outflow passage 114 is constructed to be sufficiently smaller than the cross-sectional area of the second ink chamber 132. On this account, the ink, which is stored in the second ink chamber 132, does not flow into the ink outflow passage 114 even when the ink tank 100 is in any attitude other than the usable attitude, i.e., irrelevant to the attitude of the ink tank 100. Note that when the nozzles 40 are not covered with the cap, the nozzles 40 are open. In other words, the other end of the ink outflow passage 114 is open. On this account, the ink, which is stored in the second ink chamber 132, can flow into the ink outflow passage 114.

On the other hand, the opening 145 described above and the atmosphere communication passage described later on are boundaries. The boundary is the space which has at least one of one end and the other end connected to the ink chamber 111. Even if one end or the other end is closed, the ink, which is stored in the ink chamber 111, can flow into the space. In this embodiment, the ink tank 100 is provided with only the opening 145 and the atmosphere communication passage as the boundaries. However, it is also allowable to provide any boundary other than the opening 145 and the atmosphere communication passage.

<Atmosphere Communication Passage>

As depicted in FIGS. 4 to 7, the casing 140 has the atmosphere communication passage. The atmosphere communication passage is the communication passage which is provided in order that the ink chamber 111 is communicated with the outside of the ink tank 100. In other words, the atmosphere communication passage is the communication passage which is provided in order that the ink chamber 111 is open to the atmospheric air. The atmosphere communication passage is provided with a first communication passage 171 and a second communication passage 172 depicted in FIGS. 4 and 6, and a third communication passage 173 depicted in FIGS. 4 to 7. The first communication passage 171 and the second communication passage 172 are positioned at the right of the inner wall 71. The third communication passage 173 is positioned both at the right of and at the left of the inner wall 71.

As depicted in FIGS. 4 and 6, the first communication passage 171 is communicated with the front ink chamber 137 of the first ink chamber 131 via an opening 174. The opening 174 is formed by cutting out the right front end portion of the inner wall 75 leftwardly from the right end. The opening 174 is defined by the inner wall 75, the inner wall 74, and the film 142.

The first communication passage 171 extends rearwardly from the opening 174, the first communication passage 171 subsequently makes a U-turn to extend frontwardly, and the first communication passage 171 arrives at the through-hole 175 (see FIGS. 6 and 7). The through-hole 175 is provided through the inner wall 71. The through-hole 175 is provided slightly frontwardly from the center of the protrusion 144 in relation to the front-rear direction 8. The through-hole 175 makes communication between the right and the left of the inner wall 71.

The first communication passage 171 has the front and rear surfaces and the upper and lower surfaces which are defined by the upper wall 104, the inner wall 73, the inner wall 74, the inner wall 75, the inner wall 76, and the inner wall 77. Further, the first communication passage 171 has the left surface which is defined by the inner wall 71, and the first communication passage 171 has the right surface which is defined by the film 142.

The lower end of the second communication passage 172 is communicated with the upper end (virtual surface) of the upper ink chamber 52 of the second ink chamber 132. The second communication passage 172 extends upwardly from the communication position with respect to the upper ink chamber 52, the second communication passage 172 subsequently extends frontwardly, the second communication passage 172 subsequently extends upwardly, the second communication passage 172 subsequently extends frontwardly, and the second communication passage 172 arrives at the through-hole 175.

The second communication passage 172 has the rear surface and the upper surface which are defined by the rear wall 110, the upper wall 104, the rear wall 144B of the protrusion 144, and the upper wall 144C of the protrusion 144. Further, the second communication passage 172 has the front surface and the lower surface which are defined by the inner wall 73 and the inner wall 76. Further, the second communication passage 172 has the left surface which is defined by the inner wall 71, and the second communication passage 172 has the right surface which is defined by the film 142.

As depicted in FIGS. 5 and 7, the third communication passage 173 is provided with a left communication passage 176, a right communication passage 177, a rear communication passage 178, and a labyrinth 179.

The left communication passage 176 extends leftwardly from the through-hole 175 (see FIGS. 6 and 7) to the left end of the frame 141. The left communication passage 176 is communicated with the first communication passage 171 and the second communication passage 172 via the through-hole 175. The left communication passage 176 is communicated with the right communication passage 177 via an opening 180. The opening 180 is formed by cutting out the left lower end portion of the inner wall 78 rightwardly from the left end. The opening 180 is defined by the inner wall 78, the inner wall 152, and the film 143.

The left communication passage 176 has the front surface which is defined by the inner wall 78, the left communication passage 176 has the rear surface and the lower surface which are defined by the inner wall 152, the left communication passage 176 has the upper surface which is defined by the upper wall 144C of the protrusion 144, and the left communication passage 176 has the left surface which is defined by the film 143.

The right communication passage 177 extends rightwardly from the opening 180 to the right end of the frame 141. As depicted in FIGS. 4, 6, and 7, an opening 181 is formed at the portion of the inner wall 71 at which the right communication passage 177 is formed. The left side and the right side of the inner wall 71 in the right communication passage 177 are communicated by the opening 181.

As depicted in FIG. 4, a surrounding wall 182 protrudes rightwardly from the circumferential edge of the opening 181 in relation to the inner wall 71. A lower inner surface 182A of the surrounding wall 182 is inclined so that the right end is positioned upwardly as compared with the left end. A semipermeable membrane 183 (see FIG. 4) is stuck to the protruding forward end surface of the surrounding wall 182, i.e., the right surface of the surrounding wall 182. Accordingly, the right communication passage 177 is closed by the semipermeable membrane 183.

The semipermeable membrane 183 is a porous film having minute pores which shut off the passage of the ink and which permit the passage of the gas. For example, the semipermeable membrane 183 is composed of a fluororesin including, for example, polytetrafluoroethylene, polychlorotrifluoroethylene, tetrafluoroethylene-hexafluoropropylene copolymer, tetrafluoroethylene-perfluoroalkylvinylether copolymer, and tetrafluoroethylene-ethylene copolymer.

As depicted in FIGS. 5 and 7, as for the left portion disposed leftwardly from the inner wall 71 of the right communication passage 177, the front surface and the lower surface are defined by the inner wall 152, the rear surface is defined by the inner wall 78, the upper surface is defined by the upper wall 144C of the protrusion 144, the portion of the right surface except for the opening 181 is defined by the inner wall 71 (see FIG. 6), and the left surface is defined by the film 143.

Further, as depicted in FIGS. 4 and 6, as for the right side disposed rightwardly from the inner wall 71 of the right communication passage 177, the front surface is defined by the front wall 144A of the protrusion 144, the lower surface is defined by the inner wall 77 and the lower inner surface 182A of the surrounding wall 182, the rear surface is defined by the inner wall 78, the upper surface is defined by the upper wall 144C of the protrusion 144, the portion except for the opening 181 of the left surface is defined by the inner wall 71, and the right surface is defined by the film 142.

As depicted in FIGS. 5 and 7, the rear communication passage 178 is communicated with the right portion disposed rightwardly from the inner wall 71 of the right communication passage 177 via an opening 184 (see FIGS. 6 and 7) which is formed between the inner wall 71 and the front wall 144A of the protrusion 144. The rear communication passage 178 extends leftwardly from the opening 184, the rear communication passage 178 subsequently extends rearwardly, and the rear communication passage 178 arrives at the labyrinth 179 via an opening 185 which is formed between the inner wall 151 and the inner wall 152.

The rear communication passage 178 has the lower surface and the front surface which are defined by the inner wall 151 and the front wall 144A of the protrusion 144, the rear communication passage 178 has the rear surface and the upper surface which are defined by the inner wall 152, the rear communication passage 178 has the right surface which is defined by the inner wall 71, and the rear communication passage 178 has the left surface which is defined by the film 143.

The labyrinth 179 is the communication passage including a plurality of partition walls 186 which extend in the up-down direction 7 and which are provided while being aligned in the front-rear direction 8, whereby the communication passage extends in the front-rear direction 8 while repeating U-turns in the up-down direction 7. One end (front lower end) of the labyrinth 179 is communicated with the rear communication passage 178 via the opening 185. The other end (rear upper end) of the labyrinth 179 is communicated with an atmospheric air open port 187 (see FIG. 5).

The atmospheric air open port 187 is constructed as the hole which penetrates through the upper wall 144C of the protrusion 144 in the up-down direction 7. The lower end of the atmospheric air open port 187 is communicated with the labyrinth 179. The upper end of the atmospheric air open port 187 is communicated with the outside of the ink tank 100. The atmospheric air open port 187 is positioned upwardly from the liquid surface of the ink provided when the ink, which is in the permitted maximum amount, is stored in the ink chamber 111 in the usable attitude of the ink tank 100.

According to the above, as depicted in FIG. 4, the atmosphere communication passage is communicated with the first ink chamber 131 of the ink chamber 111 at the opening 174, and the atmosphere communication passage is communicated with the second ink chamber 132 of the ink chamber 111 at the lower end of the second communication passage 172. On the other hand, as depicted in FIG. 5, the atmosphere communication passage is communicated with the outside of the ink tank 100 at the atmospheric air open port 187.

<Ink Tank 100B>

Figure 8:
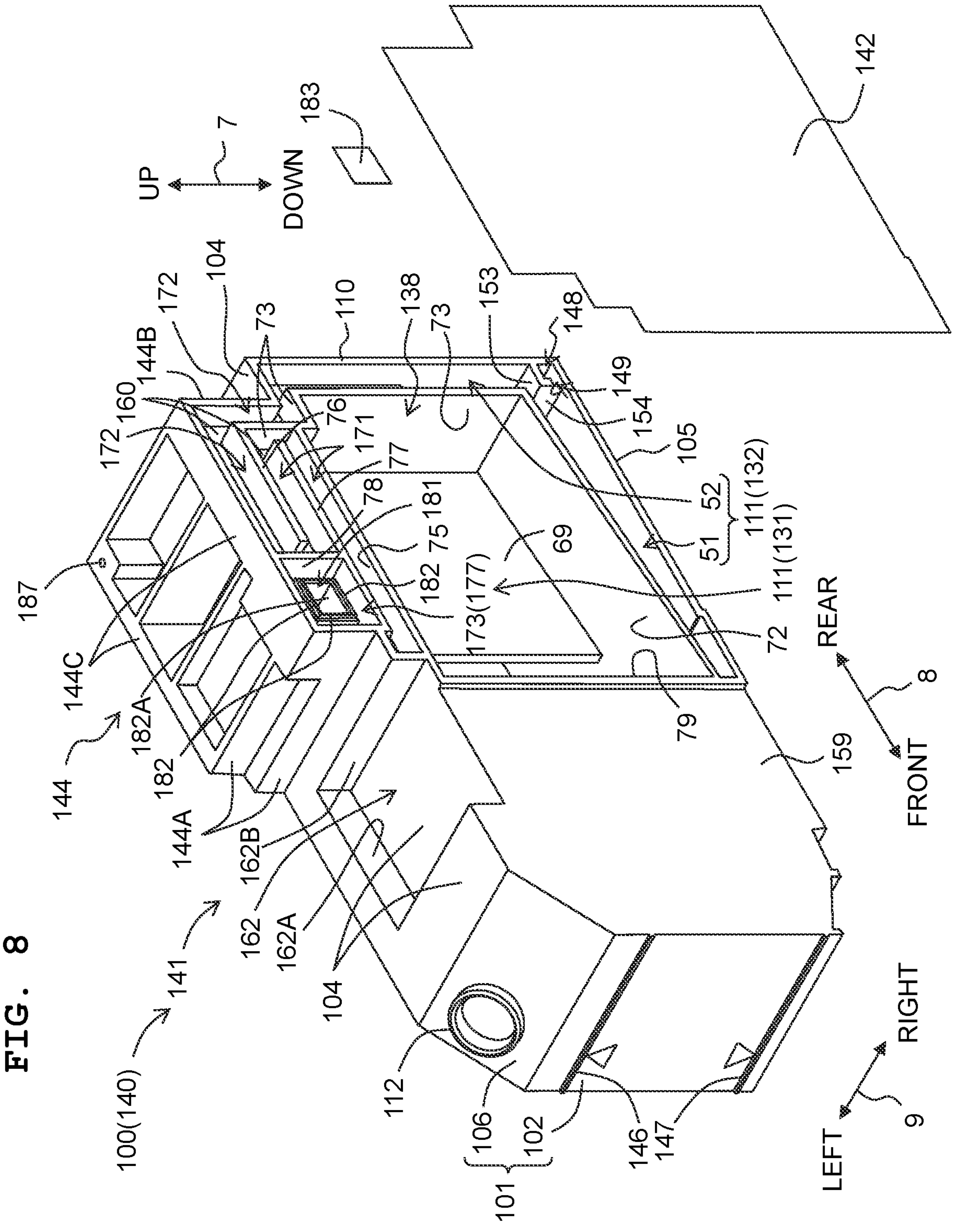
FIG. 8 is a front perspective view of an ink tank for a black ink.
Figure 9:
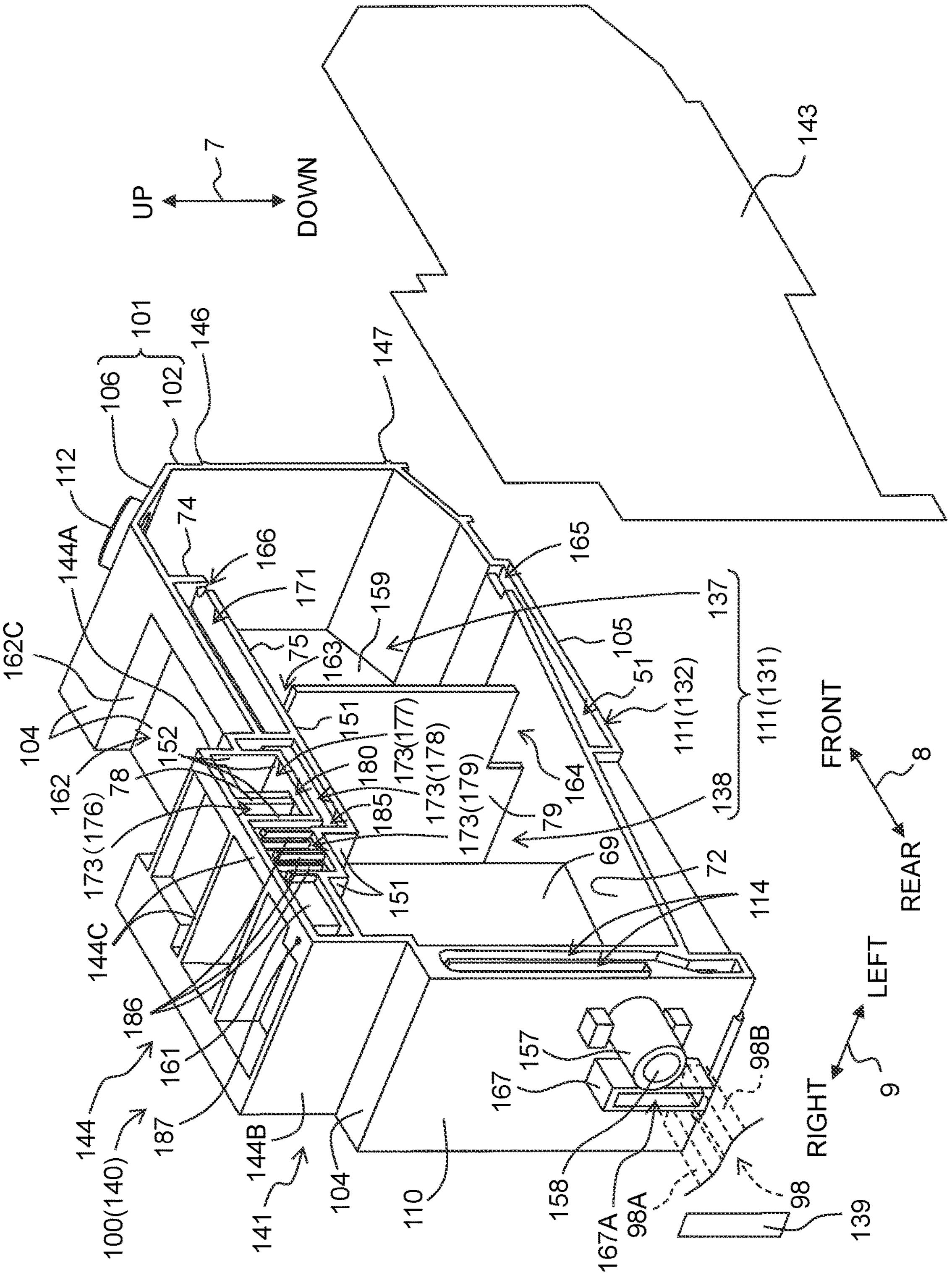
FIG. 9 is a rear perspective view of the ink tank for the black ink.

The structure of the ink tank 100B will be explained below with reference to FIGS. 8 to 11. As depicted in FIGS. 8 and 9, the ink tank 100B is longer in the left-right direction 9 than the ink tanks 100Y, 100C, 100M (see FIGS. 4 and 5).

The ink tank 100B will be explained below about portions which are different from those of the ink tanks 100Y, 100C, 100M. Note that portions of the ink tank 100B, which are constructed in the same manner as those of the ink tanks 100Y, 100C, 100M, are designated by the same reference numerals as those depicted in FIGS. 4 to 7, and any explanation thereof will be omitted on this assumption. Further, if the structures of predetermined portions of the ink tank 100B are different from the structures of portions of the ink tanks 100Y, 100C, 100M corresponding to the predetermined portions only in that the structures of the predetermined portions of the ink tank 100B are longer in the left-right direction 9 than the structures of the portions of the ink tanks 100Y, 100C, 100M corresponding to the predetermined portions, then the predetermined portions of the ink tank 100B are designated by the same reference numerals as those depicted in FIGS. 4 to 7, and any explanation thereof will be omitted on this assumption.

As depicted in FIGS. 8 and 9, a casing 140 of the ink tank 100B is provided with a frame 141 and three films 139, 142, 143.

Figure 10:
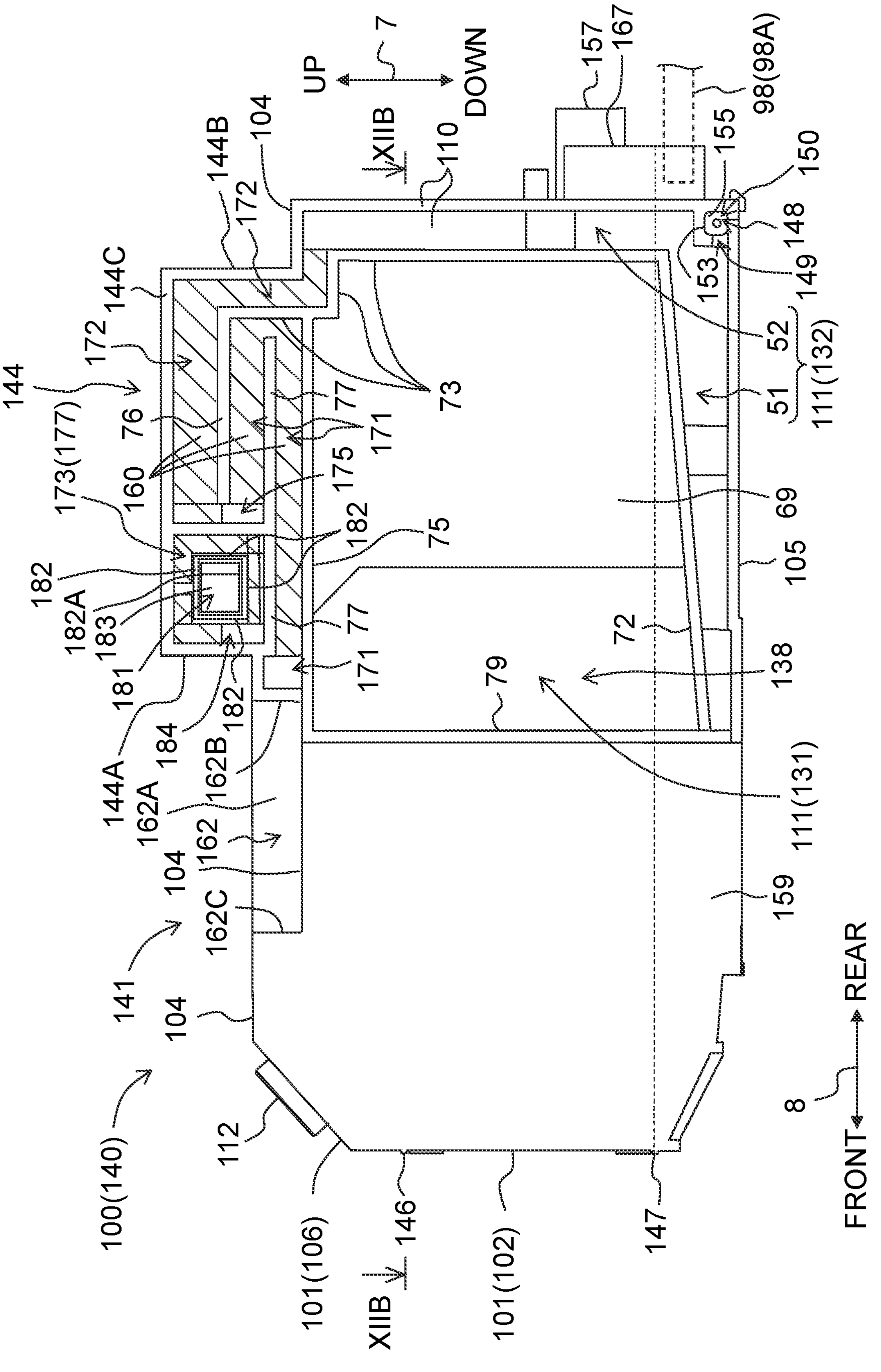
FIG. 10 is a right side view of the ink tank for the black ink.

As depicted in FIGS. 8 and 10, the ink tank 100B is not provided with the left wall 103 (see FIG. 5) with which the ink tanks 100Y, 100C, 100M are provided, but the ink tank 100B is provided with a right wall 159. The right wall 159 is the wall which extends rearwardly from the right end of a front wall 101. The upper end of the right wall 159 is connected to a front portion of an upper wall 104. The lower end of the right wall 159 is connected to a front portion of a lower wall 105. In other words, the right wall 159 is the wall which connects the right end of the front wall 101, the front right end of the upper wall 104, and the front right end of the lower wall 105. In other words, the right wall 159 is provided at only the front portion of the frame 141, and the right wall 159 is not provided at the rear portion of the frame 141.

As depicted in FIGS. 8 and 9, a recess 162 is formed at the front portion of the upper wall 104. The recess 162 is defined by side walls 162A, 162B, 162C and the upper wall 104.

The ink tank 100B is not provided with the inner wall 71 (see FIG. 6). The ink tank 100B is provided with an inner wall 160 (see FIGS. 8 and 10) and an inner wall 161 (see FIGS. 9 and 11) which are the walls corresponding to the inner wall 71 (see FIG. 6).

The inner wall 160 and the inner wall 161 extend downwardly from the upper wall 104 and an upper wall 144C of a protrusion 144. The inner wall 160 and the inner wall 161 are the walls which spread in the up-down direction 7 and the front-rear direction 8.

The inner wall 160 is provided in a range of hatching depicted in FIG. 10. The inner wall 160 is provided at a position disposed between the right end and the left end of the frame 141 in relation to the left-right direction 9. For example, the inner wall 160 is provided on the right side of the center of the frame 141 in relation to the left-right direction 9.

Figure 11:
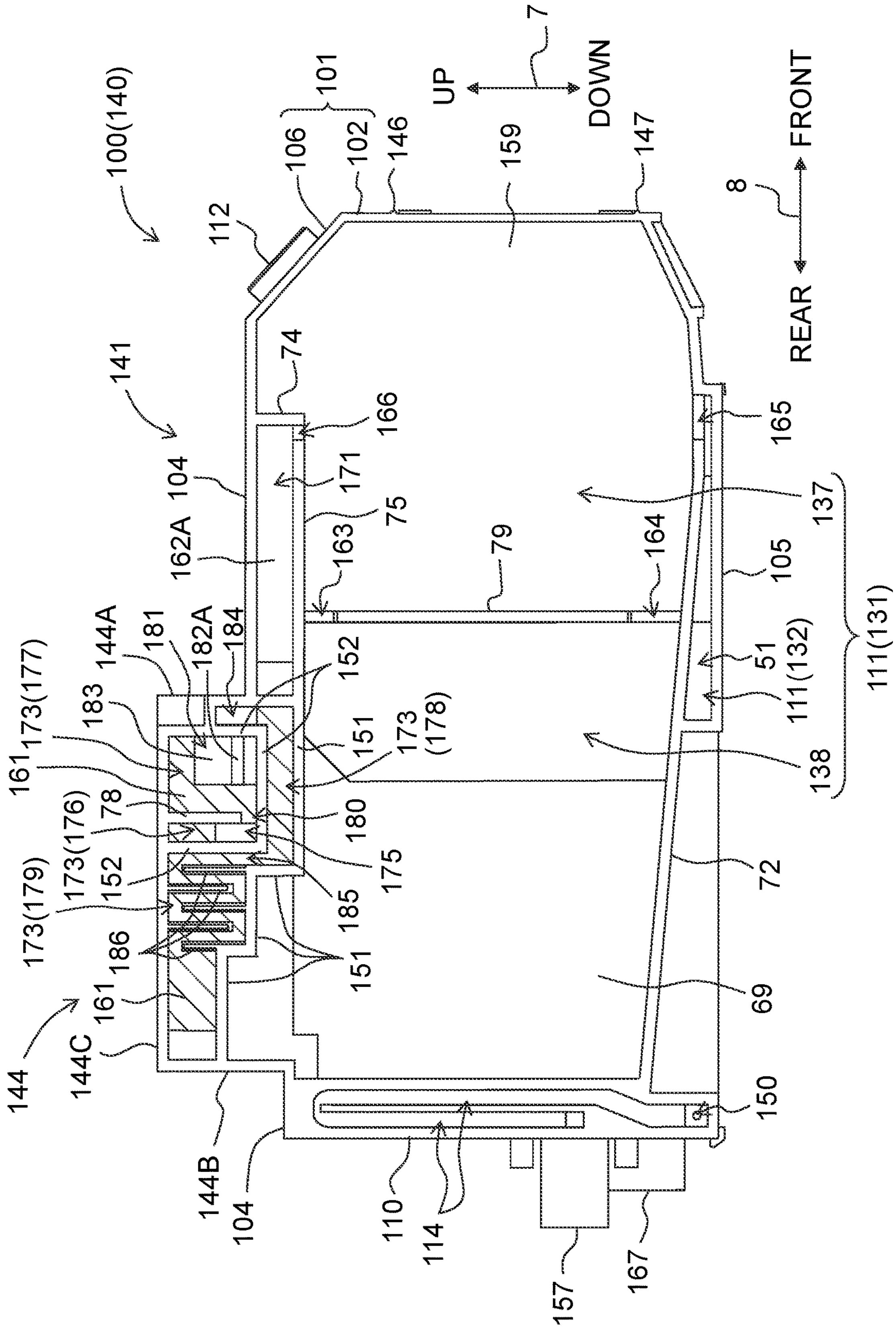
FIG. 11 is a left side view of the ink tank for the black ink.

The inner wall 161 is provided in a range of hatching depicted in FIG. 11. The inner wall 161 is provided at a position disposed at the left of the inner wall 160 between the right end and the left end of the frame 141 in relation to the left-right direction 9. For example, the inner wall 161 is provided on the left side of the center of the frame 141 in relation to the left-right direction 9.

As depicted in FIGS. 8 and 10, the portion of the inner wall 73 disposed upwardly from the inner wall 75, the portion of the inner wall 75 deviated toward the inner wall 73, the inner wall 76, and the inner wall 77 extend rightwardly from the inner wall 160. In other words, the portion of the inner wall 73 disposed upwardly from the inner wall 75, the portion of the inner wall 75 deviated toward the inner wall 73, the inner wall 76, and the inner wall 77 are provided on the right side of the inner wall 160.

As depicted in FIGS. 9 and 11, the inner wall 74 and the portion of the inner wall 75 deviated toward the inner wall 74 extend leftwardly from the side wall 162A. In other words, the inner wall 74 and the portion of the inner wall 75 deviated toward the inner wall 74 are provided on the left side of the side wall 162A.

As depicted in FIGS. 9 and 11, the inner wall 74 extends downwardly from the left front portion of the upper wall 104. The inner wall 74 is not connected to the inner wall 160 and the inner wall 161, but the inner wall 74 is connected to the side wall 162A.

The inner wall 75 extends rearwardly from the lower end of the inner wall 74. The portion of the inner wall 75, which extends rearwardly, extends leftwardly from the side wall 162A. Subsequently, the inner wall 75 extends rightwardly. The portion of the inner wall 75, which extends rightwardly, has the front end which is connected to a side wall 162B (see FIG. 8), and it has the rear end which is connected to the front wall 144A of the protrusion 144 (see FIGS. 8 and 11). Subsequently, the inner wall 75 extends rearwardly. The portion of the inner wall 75, which extends rearwardly, extends rightwardly from the inner wall 160.

As depicted in FIGS. 8 and 10, the right end of the inner wall 79 is connected to the right wall 159.

As depicted in FIGS. 9 and 11, the inner wall 151 is the wall which connects the lower end of the front wall 144A of the protrusion 144 and the rear wall 144B of the protrusion 144. The inner wall 151 extends rearwardly from the lower end of the front wall 144A, the inner wall 151 subsequently extends upwardly, the inner wall 151 subsequently extends rearwardly, the inner wall 151 subsequently extends upwardly, the inner wall 151 subsequently extends rearwardly, and the inner wall 151 arrives at the rear wall 144B.

As depicted in FIG. 8, the rear portion of the right surface of the frame 141 is open. The right surface of the frame 141 is sealed by welding the film 142 to the right surfaces of the lower wall 105, the rear wall 110, the upper wall 104, the inner walls 72, 73, 75 to 79, the side wall 162B of the recess 162, the front wall 144A of the protrusion 144, the rear wall 144B of the protrusion 144, and the upper wall 144C of the protrusion 144.

As depicted in FIG. 9, the left surface of the frame 141 is open. The left surface of the frame 141 is sealed by welding the film 143 to the left surfaces of the rear wall 110, the upper wall 104, the lower wall 105, the inner wall 72, the inner wall 74, the inner wall 75, the inner wall 78, the inner wall 79, the inner wall 151, the inner wall 152, the front wall 144A of the protrusion 144, the rear wall 144B of the protrusion 144, the upper wall 144C of the protrusion 144, and the partition wall 186.

As depicted in FIGS. 8 and 9, the first ink chamber 131 is defined by the front wall 101, the right wall 159, the lower wall 105, the rear wall 110, the inner wall 72, the inner wall 73, the inner wall 74, the inner wall 75, the upper wall 104, the inner wall 151, the film 142, and the film 143. The right wall 159 and the film 142 define the right surface of the first ink chamber 131.

As depicted in FIG. 9, the upper end portion of the inner wall 79 is cut out rightwardly from the left end. Accordingly, an opening 163 is formed at the upper end portion of the inner wall 79. The opening 163 is defined by the inner wall 79, the inner wall 75, and the film 143. The lower end portion of the inner wall 79 is also cut out rightwardly from the left end. Accordingly, an opening 164 is formed at the lower end portion of the inner wall 79. The opening 164 is defined by the inner wall 79, the inner wall 72, and the film 143. The front ink chamber 137 and the rear ink chamber 138 are communicated with each other by the openings 163, 164.

The front end portion of the inner wall 72 is cut out rightwardly from the left end. Accordingly, an opening 165 is formed at the front end portion of the inner wall 72. The opening 165 is defined by the inner wall 72, the lower wall 105, and the film 143. The front ink chamber 137 of the first ink chamber 131 and the lower ink chamber 51 of the second ink chamber 132 are communicated with each other by the opening 165.

The right surface of the ink chamber 111 is defined by the right wall 159 and the left surface 142L of the film 142. In other words, a part of the right surface of the ink chamber 111 is constructed by the film 142.

Further, the left surface of the ink chamber 111 is defined by the right surface 143R of the film 143. In other words, the entire left surface of the ink chamber 111 is constructed by the film 143.

The right surface and the left surface of the ink chamber 111 are opposed to one another in a state of being separated from each other. In other words, the right surface and the left surface of the ink chamber 111 are mutually opposed to one another.

In the case of the ink tank 100B, a part of the film 142 for constructing the right surface of the ink chamber 111 and a part of the film 143 for constructing the left surface of the ink chamber 111 are opposed to one another.

Figure 12B:
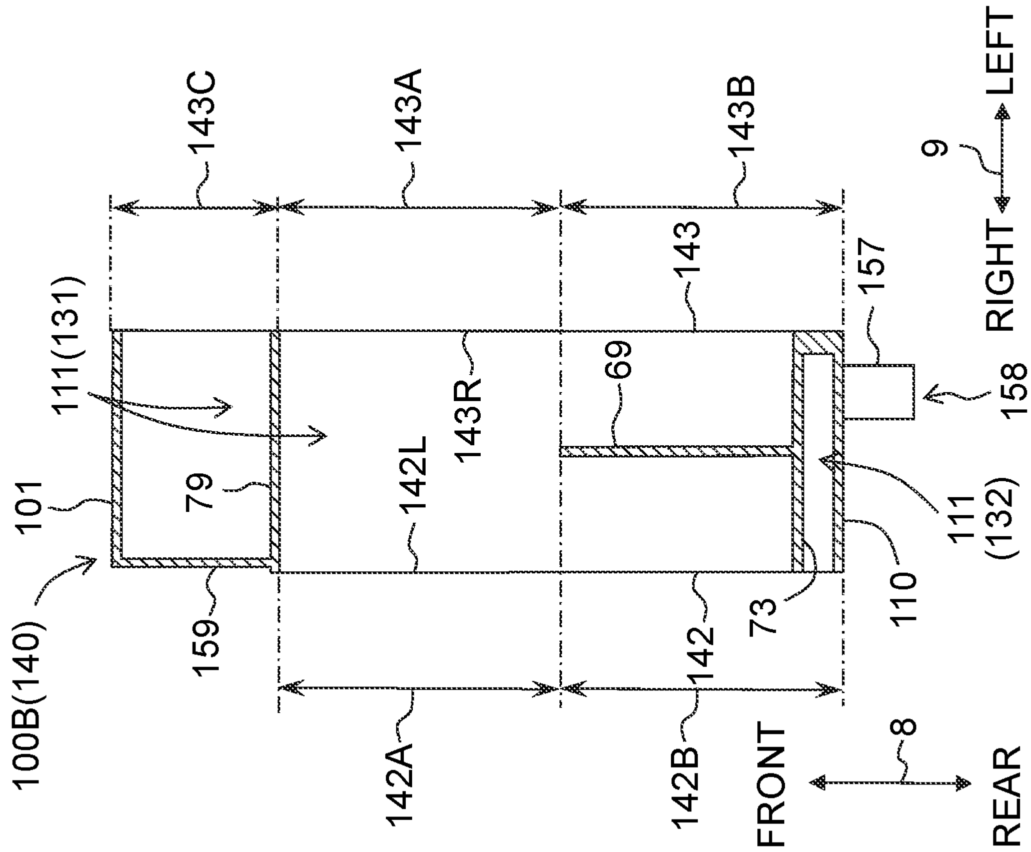
FIG. 12B is a schematic view of a cross section taken along XIIB-XIIB of FIG. 10.
Figure 13:
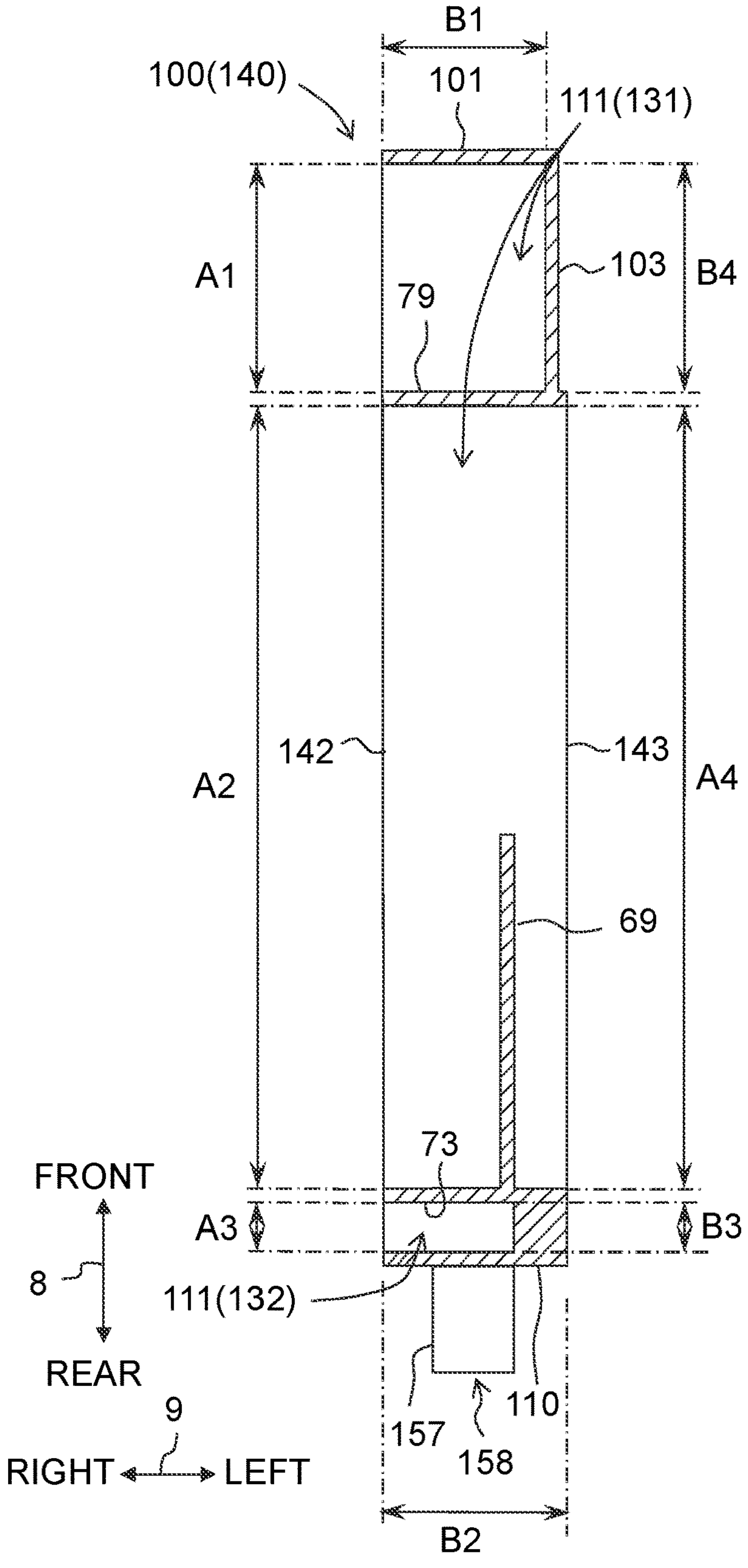
FIG. 13 is a schematic view of a cross section taken along XIIA-XIIA of FIG. 6.

Specifically, as depicted in FIG. 12B, the portion of the film 142 which is disposed frontwardly from the inner wall 69 in the front-rear direction 8 and the portion of the film 143 which is disposed rearwardly from the inner wall 79 and frontwardly from the inner wall 69 are opposed to one another without any other member intervening therebetween. In other words, the central portion 142A of the film 142 in the front-rear direction 8 and the central portion 143A of the film 143 in the front-rear direction 8 are opposed to one another.

Further, the rear portion 142B of the film 142 and the rear portion 143B of the film 143 are opposed to one another in a state in which the inner wall 69 intervenes therebetween.

Note that the portion, which is opposed to the front portion 143C of the film 143 in relation to the right surface of the ink chamber 111, is not the film 142 but the right wall 159. In other words, the front portion 143C of the film 143 is not opposed to the film 142.

As depicted in FIGS. 8 and 10, the first communication passage 171 and the second communication passage 172 are positioned at the right of the inner wall 160. As depicted in FIGS. 8 to 11, the third communication passage 173 is positioned both at the right of the inner wall 160 and at the left of the inner wall 161.

As depicted in FIG. 9, the first communication passage 171 is communicated with the front ink chamber 137 of the first ink chamber 131 via an opening 166. The opening 166 is formed by cutting out the left front end portion of the inner wall 75 rightwardly from the left end. The opening 166 is defined by the inner wall 75, the inner wall 74, and the film 143. The first communication passage 171 extends rearwardly from the opening 166, and the first communication passage 171 subsequently extends rightwardly. Then, as depicted in FIG. 8, the first communication passage 171 extends rearwardly, the first communication passage 171 subsequently makes a U-turn to extend frontwardly, and the first communication passage 171 arrives at the through-hole 175 (see FIG. 10). The through-hole 175 is the hole which penetrates through the inner wall 160 and the inner wall 161 in the left-right direction 9. The through-hole 175 connects the first communication passage 171 and the second communication passage 172 to the third communication passage 173.

As depicted in FIG. 9, the portion of the first communication passage 171, which extends rearwardly from the opening 166, is defined by the upper wall 104, the side wall 162A of the recess 162, the inner wall 74, the inner wall 75, and the film 143. The portion of the first communication passage 171, which extends rightwardly, is defined by the upper wall 104, the side wall 162B of the recess 162, the inner wall 75, and the front wall 144A of the protrusion 144. As depicted in FIG. 8, the portion of the first communication passage 171, which is disposed at the right of the inner wall 160, is defined by the inner wall 160, the inner wall 73, the inner wall 75, the inner wall 76, the inner wall 77, and the film 142.

As depicted in FIG. 9, the frame 141 is provided with a protruding portion 167 (example of the liquid surface detecting unit) which protrudes rearwardly from the rear wall 110. The protruding portion 167 detects the height of the liquid surface of the ink stored in the ink chamber 111 of the ink tank 100 which is in the usable attitude, by being irradiated with light by an optical sensor 98 as described later on. The protruding portion 167 has a rectangular parallelepiped shape. The protruding portion 167 has an internal space 167A, and the front end and the rear end of the protruding portion 167 are open. The front end of the internal space 167A of the protruding portion 167 is communicated with the upper ink chamber 52 of the second ink chamber 132. In other words, the internal space 167A is provided for the second ink chamber 132. The rear end of the protruding portion 167 is open. The open rear end of the protruding portion 167 is closed by sticking the film 139.

When a horizontal cross section of the ink tank 100, which is provided at a height of not more than the upper end and not less than the lower end of the internal space 167A of the protruding portion 167, is viewed from an upper position, the cross-sectional area of the second ink chamber 132 is smaller than the cross-sectional area of the first ink chamber 131. Then, the internal space 167A of the protruding portion 167 is communicated with the second ink chamber 132 having the small cross-sectional area.

Note that in this embodiment, the internal space 167A of the protruding portion 167 is communicated with the second ink chamber 132. However, the internal space 167A may be communicated with the first ink chamber 131. In other words, the internal space 167A may be provided for the first ink chamber 131. In this case, the protruding portion 167 may protrude, for example, from the front wall 101 or the left wall 103.

Further, in this embodiment, the protruding portion 167 is provided for only the ink tank 100B, of the ink tanks 100B, 100Y, 100C, 100M. However, the protruding portion 167 may be provided for at least one of the ink tanks 100B, 100Y, 100C, 100M.

<Optical Sensor 98>

The printer unit 11 is provided with an optical sensor 98. The optical sensor 98 is attached to the casing 14. As depicted by broken lines in FIG. 9, the optical sensor 98 is positioned at the right of and at the left of the protruding portion 167 of the frame 141 of the ink tank 100B in the state in which the tank set 99 is set up at the inside of the casing 14.

The optical sensor 98 is provided with a light-emitting unit 98A and a light-receiving unit 98B. The light-emitting unit 98A and the light-receiving unit 98B are arranged in the left-right direction 9 while interposing the protruding portion 167. The light-emitting unit 98A is positioned at the right of the protruding portion 167. The light-receiving unit 98B is positioned at the left of the protruding portion 167. Note that the arrangement positions of the light-emitting unit 98A and the light-receiving unit 98B may be reversed leftside right.

The arrangement positions in the up-down direction 7 of the light-emitting unit 98A and the light-receiving unit 98B are determined so that the light irradiating position of the light radiated by the light-emitting unit 98A to the light-receiving unit 98B and the light receiving position of the light coming from the light-emitting unit 98A to the light-receiving unit 98B are not more than the second line 147. In this embodiment, as depicted in FIG. 10, the optical sensor 98 is positioned under or below the second line 147. In other words, the height of the position corresponding to the optical path of the light radiated from the optical sensor 98, which is provided on the protruding portion 167, is disposed at the position which is lower than the broken line depicted in FIG. 10. In this case, the broken line indicates the liquid surface of the ink which is in the minimum storage amount for which the ink tank in the usable attitude is required to be supplemented with the ink. According to the above, the position of the protruding portion 167 in the up-down direction 7 includes the position which is disposed under or below the second line 147.

The optical sensor 98 is electrically connected to a control unit (not depicted) of the multifunction peripheral 10 via an electric circuit.

The light is radiated from the light-emitting unit 98A to the light-receiving unit 98B. The radiated light permeates through the protruding portion 167, and the light enters the internal space 167A of the protruding portion 167. If the liquid surface of the ink stored in the internal space 167A is disposed over or above the irradiation route of the light, then the light is shielded or shut off by the ink stored in the internal space 167A, and the light does not arrive at the light-receiving unit 98B. Accordingly, the low level signal is outputted from the optical sensor 98 to the control unit. On the other hand, if the liquid surface of the ink is disposed under or below the route of the light, the light travels in the air in the internal space 167A. In this case, the light permeates through the internal space 167A, and the light arrives at the light-receiving unit 98B. Accordingly, the high level signal is outputted from the optical sensor 98 to the control unit.

If the signal outputted from the optical sensor 98 is at the low level, the control unit judges that the liquid surface of the ink stored in the ink chamber 111 is higher than the second line 147. If the signal outputted from the optical sensor 98 is at the high level, the control unit judges that the liquid surface of the ink stored in the ink chamber 111 is lower than the second line 147.

<Inlet 112>

As depicted in FIG. 1B, inlets 112B, 112Y, 112C, 112M (generally referred to as "inlet 112" in some cases), which are provided to inject the inks into the first ink chambers 131 of the ink chambers 111, are provided for the inclined walls 106 of the ink tanks 100B, 100Y, 100C, 100M respectively. The inlet 112 penetrates through the inclined wall 106 in the thickness direction so that the corresponding first ink chamber 131 is communicated with the outside of the ink tank 100. The inner surface of the inclined wall 106 faces the front ink chamber 137 of the first ink chamber 131. The outer surface of the inclined wall 106 faces the outside of the ink tank 100. Therefore, the inlet 112 directly makes communication between the first ink chamber 131 and the outside of the ink tank 100. In other words, in this embodiment, the inlet 112 is provided at the first ink chamber 131 for which the protruding portion 167 is not provided. Note that the inlet 112 may be provided in order to inject the ink into the second ink chamber 132.

The inclined wall 106 and the inlet 112 provided for the inclined wall 106 are exposed to the outside of the multifunction peripheral 10 via the opening 22 by positioning the cover 70 at the open position. The attitude or posture (injection attitude) of the ink tank 100, which is brought about when the ink is injected into the first ink chamber 131 via the inlet 112, is the usable attitude. That is, the ink is injected into the first ink chamber 131 via the inlet 112 when the ink tank 100 is in the usable attitude.

<Cap 113>

As depicted in FIG. 1, the ink tank 100 has caps 113B, 113Y, 113C, 113M which are detachable with respect to the inclined walls 106 so that the inlets 112 are closed. The four caps 113B, 113Y, 113C, 113M correspond to the four inlets 112B, 112Y, 112C, 113M of the ink tanks 100 respectively. As depicted in FIG. 1A, the cap 113, which is attached to the inclined wall 106, adheres to the wall surface for defining the circumferential edge of the inlet 112 to close the inlet 112. On the other hand, as depicted in FIG. 1B, the cap 113, which is detached from the inclined wall 106, opens or releases the inlet 112. The cap 113 is attached/detached with respect to the inclined wall 106 in a state in which the cover 70 is positioned at the open position. Further, the ink can be injected into the ink chamber 111 via the inlet 112 by detaching the cap 113 from the inlet 112.

<Cover 70>

As depicted in FIGS. 1A and 1B, the cover 70 is provided so that the opening 22, which is formed at the front wall 14A of the casing 14, can be opened/closed. The cover 70 is rotatable about a rotating shaft 70A extending in the left-right direction 9. The cover 70 has an outer shape of a size corresponding to the opening 22, and the cover 70 has a box-shaped form which is open toward the opening 22. The cover 70 covers the inclined wall 106 and the upstanding wall 102 of the front wall 101 of the ink tank 100 at the closed position. The cover 70 exposes, to the outside of the casing 14, the inclined wall 106 and the upstanding wall 102 of the front wall 101 of the ink tank 100.

<Arrangement of Respective Ink Tanks 100 in Tank Set 99>

The four ink tanks 100B, 100Y, 100C, 100M, which are disposed in the tank set 99, are arranged while being aligned in the left-right direction 9 (example of the predetermined direction) in a state of being in proximity to one another. The films 142, 143, which constitute at least parts of the mutually opposing surfaces (i.e., the left surface of the casing 140 of the ink tank 100B and the right surface of the casing 140 of the ink tank 100Y, the left surface of the casing 140 of the ink tank 100Y and the right surface of the casing 140 of the ink tank 100C, and the left surface of the casing 140 of the ink tank 100C and the right surface of the casing 140 of the ink tank 100M) of the two adjoining ink tanks 100, are separated from each other.

In this case, the right surface of the casing 140 of the ink tank 100 designates the right surface of at least one of the film 142 and the right wall 159. Further, the left surface of the casing 140 of the ink tank 100 designates the left surface of at least one of the film 143 and the left wall 103.

The right surfaces and the left surfaces of the casings 140 of the four ink tanks 100B, 100Y, 100C, 100M spread in the up-down direction 7 and the front-rear direction 8 respectively. Therefore, as for the two mutually adjoining ink tanks 100, the mutually opposing surfaces of the two casings 140 are parallel to one another.

As described above, as for the ink tanks 100Y, 100C, 100M, at least the parts of the right surface and the left surface of the ink chamber 111 are composed of the films 142, 143 respectively (see FIG. 12A). Further, as for the ink tank 100B as well, at least the parts of the right surface and the left surface of the ink chamber 111 are composed of the films 142, 143 respectively (see FIG. 12B). Therefore, in the tank set 99, the four ink tanks 100B, 100Y, 100C, 100M are arranged as depicted in FIG. 15A.

Figure 15A:
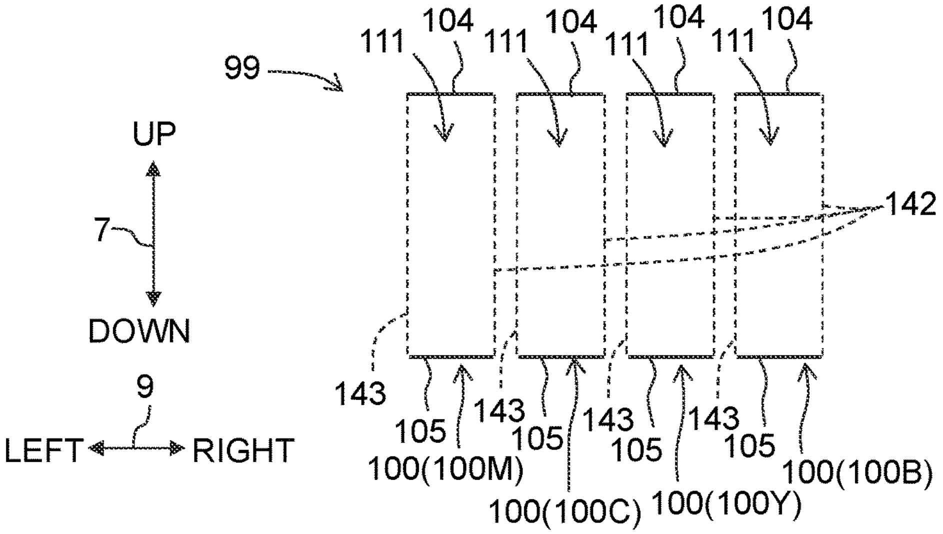
FIGS. 15A to 15C are front views schematically depicting arrangements of respective ink tanks of tank sets.
Figure 15B:
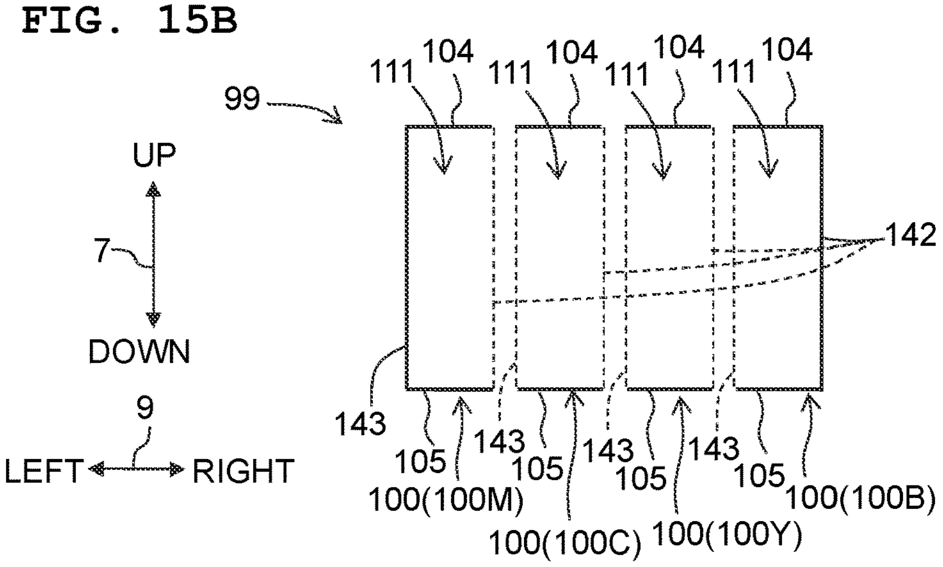
Figure 15C:
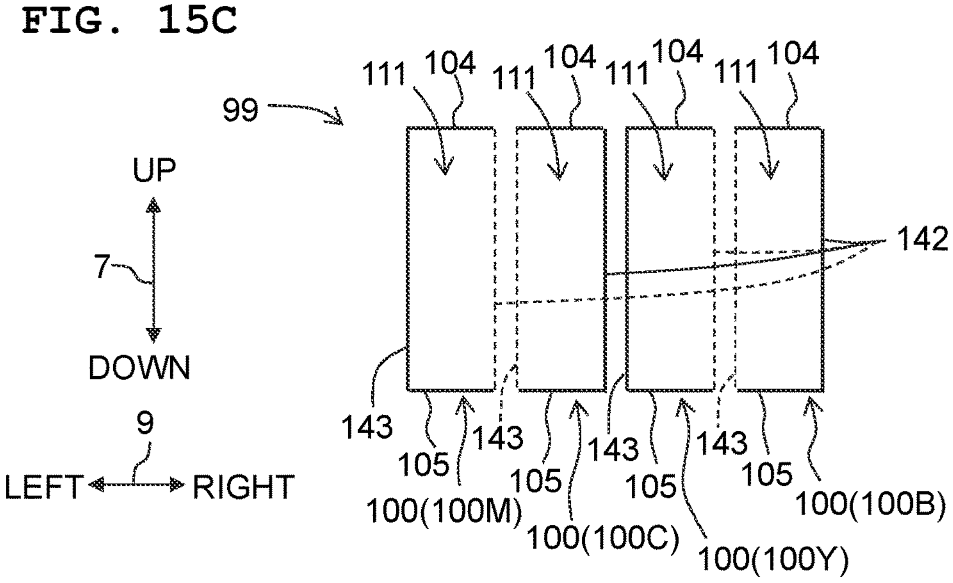

Note that FIGS. 15A to 15C depict that the portions of the ink tank 100, which are depicted by solid lines, are constructed by the walls, and FIGS. 15A to 15C depict that at least parts of the portions of the ink tank 100, which are depicted by broken lines, are composed of the films.

In the case of the tank set 99 depicted in FIG. 15A, at least parts of the right surfaces and the left surfaces of the ink chambers 111 of all of the four ink tanks 100B, 100Y, 100C, 100M are composed of the films 142, 143.

In the case of the tank set 99 depicted in FIG. 15A, the surfaces, at least parts of which are composed of the films, are arranged mutually opposingly in relation to all of the combinations of the two mutually adjoining ink tanks 100 (i.e., the ink tank 100B and the ink tank 100Y, the ink tank 100Y and the ink tank 100C, and the ink tank 100C and the ink tank 100M).

In this embodiment, as for the tank set 99, as depicted in FIG. 15A, the films are included in both of the right surfaces and the left surfaces of the ink chambers of all of the ink tanks 100. However, it is also allowable that the film is included in only one of the right surface and the left surface of the ink chamber 111 in relation to one ink tank 100 or some of the ink tanks 100 of the tank set 99.

For example, in the case of the tank set 99 depicted in FIG. 15B, the films are included in both of the right surface and the left surface of the ink chamber 111 in relation to the ink tanks 100Y, 100C, while the film is included in only one of the right surface and the left surface of the ink chamber 111 in relation to the ink tanks 100B, 100M.

Further, in this embodiment, as depicted in FIG. 15A, the surfaces, which include the films, are arranged mutually opposingly to one another in relation to all of the combinations of the two mutually adjoining ink tanks 100. However, it is also allowable that the surfaces, which include the films, are arranged mutually opposingly to one another in relation to only one or some of the combinations of the two mutually adjoining ink tanks 100.

For example, in the case of the tank set 99 depicted in FIG. 15C, the left surface of the casing 140 of the ink tank 100B and the right surface of the casing 140 of the ink tank 100Y, which are mutually opposed to one another, include the films, in relation to the combination of the ink tank 100B and the ink tank 100Y. Further, the left surface of the casing 140 of the ink tank 100C and the right surface of the casing 140 of the ink tank 100M, which are mutually opposed to one another, include the films, in relation to the combination of the ink tank 100C and the ink tank 100M. On the other hand, both of the left surface of the casing 140 of the ink tank 100Y and the right surface of the casing 140 of the ink tank 100C, which are mutually opposed to one another, do not include the film. In other words, in the case of the combination of the ink tank 100Y and the ink tank 100C, the surfaces, which include the films, are not mutually opposed to one another.

Function and Effect of Embodiment

According to the embodiment described above, at least the parts of the right surfaces and the left surfaces of the ink chambers 111 of the respective ink tanks 100 are composed of the films 142, 143 respectively. In this arrangement, the films 142, 143 are thinner than the walls. Therefore, it is possible to shorten the length of the tank set 99 in the left-right direction 9.

Further, when the ink tank 100, in which at least parts of the right surface and the left surface of the ink chamber 111 are composed of the films 142, 143 respectively, has the same outer shape dimension as that of the ink tank 100 in which the right surface and the left surface of the ink chamber 111 are not composed of the films 142, 143, then the former can store a larger amount of the ink as compared with the latter. In other words, according to the embodiment described above, it is possible to increase the amount of the ink capable of being stored in each of the ink tanks 100 of the tank set 99.

Further, in ordinary cases, the gap, which is at least in an amount corresponding to the allowable error (tolerance), is provided between the two mutually adjoining ink tanks 100. According to the embodiment described above, the two mutually adjoining ink tanks 100 are arranged such that the surfaces, in which at least the parts thereof are composed of the films 142, 143, are mutually opposed to one another. Accordingly, such a state is given that the film 142, 143 is expanded by the liquid pressure of the ink toward the mutually adjoining ink tank adjacent to the predetermined ink tank 100, in the situation in which the ink is stored in the ink chamber 111 of the predetermined ink tank 100 having the films 142, 143. It is possible to increase the amount of the ink stored in the ink chamber 111 by an amount of the expansion.

Further, according to the embodiment described above, the films 142, 143 are brought in contact with each other. Therefore, the gap disappears between the respective films 142, 143. It is possible to increase the amount of the ink stored in the ink chamber 111 by an amount corresponding thereto.

Further, according to the embodiment described above, as for at least one ink tank 100 of the tank set 99, at least the parts of the right surface and the left surface of the ink chamber 111 are constructed by the films 142, 143 respectively. Therefore, it is possible to construct the short length in the left-right direction 9 as compared with a tank set 99 in which at least a part of any one of the right surface and the left surface of the ink chamber 111 is constructed by the film 142 or the film 143. Further, in the case of the tank set 99 constructed as described above, it is possible to increase the amount of the ink capable of being stored in each of the ink tanks 100, as compared with a tank set 99 in which at least a part of any one of the right surface and the left surface of the ink chamber 111 is constructed by the film 142 or the film 143.

Further, according to the embodiment described above, as for all of the ink tanks 100 of the tank set 99, at least the parts of the right surface and the left surface of the ink chamber 111 are composed of the films 142, 143 respectively. Therefore, in the case of the tank set 99 constructed as described above, it is possible to shorten the length in the left-right direction 9 as compared with a tank set 99 in which at least parts of the right surface and the left surface of the ink chamber 111 are composed of the films 142, 143 respectively in relation to only one or some of the plurality of ink tanks 100. Further, in the case of the tank set 99 constructed as described above, it is possible to increase the amount of the ink capable of being stored in each of the ink tanks 100 as compared with a tank set 99 in which at least parts of the right surface and the left surface of the ink chamber 111 are composed of the films 142, 143 respectively in relation to only one or some of the plurality of ink tanks 100.

Further, according to the embodiment described above, the mutually opposing surfaces, which are disposed between the two casings 140, are parallel to one another in relation to the two mutually adjoining ink tanks 100. Therefore, it is possible to shorten the length in the left-right direction 9 of the tank set 99.

Modified Embodiments

Figure 14:
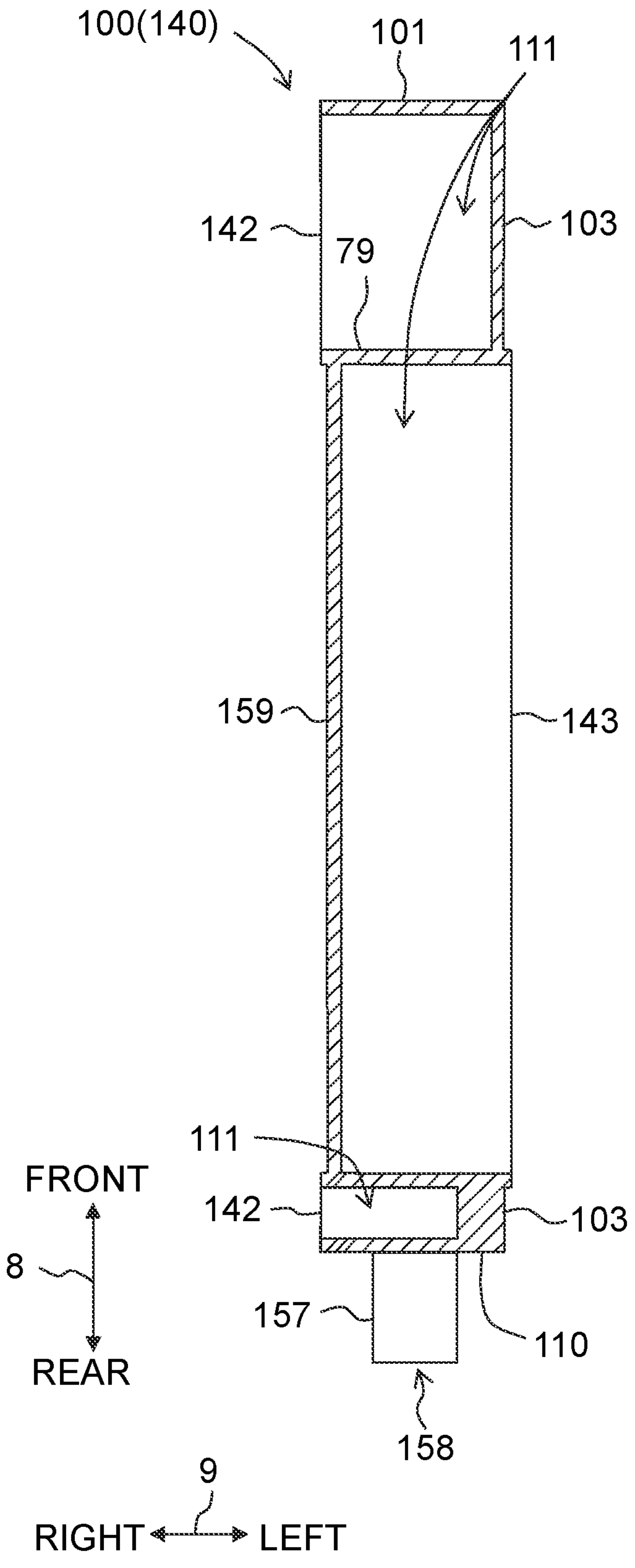
FIG. 14 is a lateral sectional view schematically depicting an ink tank according to a modified embodiment.
Figure 16:
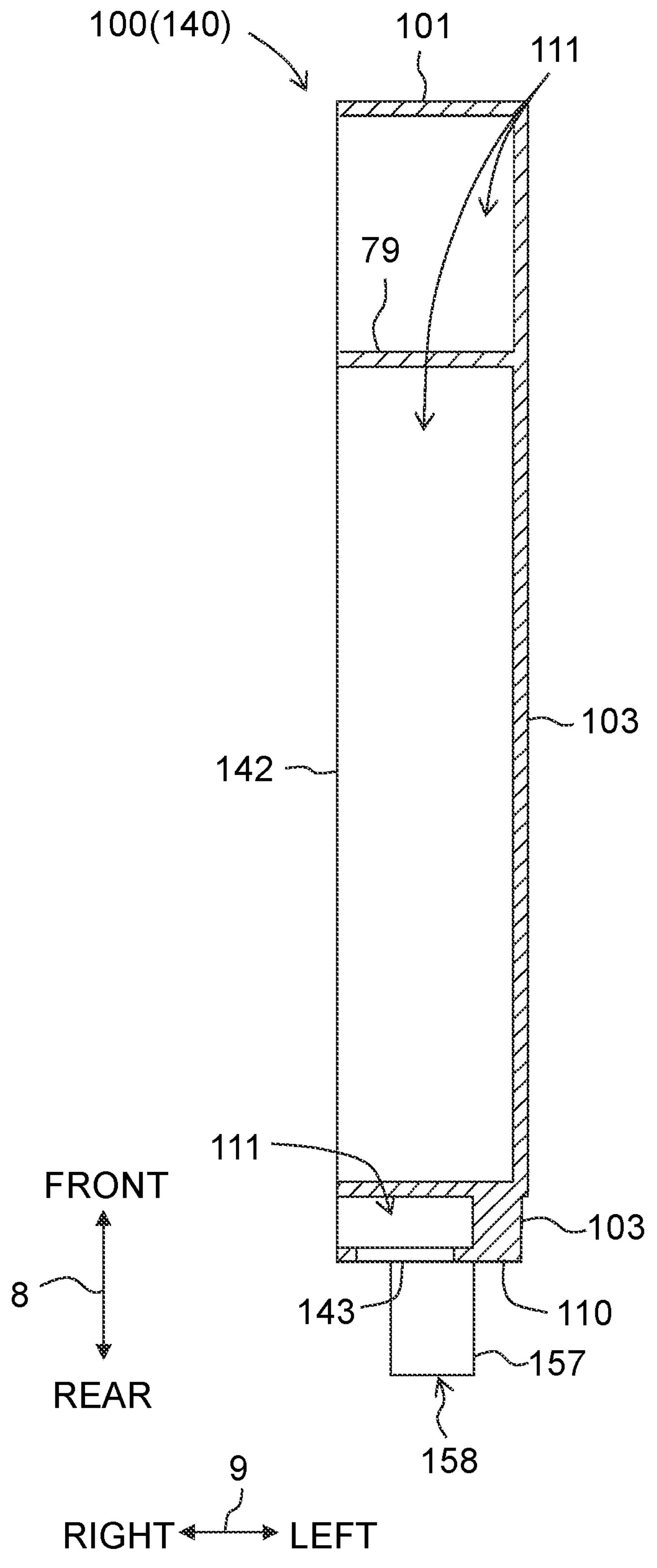
FIG. 16 is a lateral sectional view schematically depicting an ink tank according to a modified embodiment.

In the embodiment described above, the part of the film 142 and the part of the film 143 are opposed to one another in relation to each of the ink tanks 100. However, as depicted in FIGS. 14 and 16, it is also allowable that the films 142, 143 are not opposed to one another. In FIG. 16, a right side surface of the casing 140 is composed of the film 142, and a part of the rear wall 110 is composed of the film 143.

Further, in the embodiment described above, the films 142, 143, which constitute at least the parts of the mutually opposing surfaces disposed between the two mutually adjoining ink tanks 100, are separated from each other. However, it is also allowable that the films 142, 143 are brought in contact with each other.

Further, in the embodiment described above, one inlet 112 is provided for each of the ink tanks 100. However, two or more inlets 112 may be provided for each of the ink tanks 100.

Further, in the embodiment described above, one atmospheric air open port 187 is provided for each of the ink tanks 100. However, two or more atmospheric air open ports 187 may be provided for each of the ink tanks 100.

Further, in the embodiment described above, one opening 158, from which the ink contained in the ink chamber 111 flows out, is provided for each of the ink tanks 100. However, two or more openings 158 may be provided for each of the ink tanks 100.

Further, in the embodiment described above, the second ink chamber 132 is provided with the buffer chamber 148 and the ink outflow passage 114. However, the first ink chamber 131 may be provided with the buffer chamber 148 and the ink outflow passage 114. In this case, the buffer chamber 148 intervenes between the first ink chamber 131 and the ink outflow passage 114. Further, both of the first ink chamber 131 and the second ink chamber 132 may be provided with the buffer chambers 148 and the ink outflow passages 114.

Further, in the embodiment described above, the ink has been explained as an example of the liquid. However, the present teaching is not limited thereto. That is, in place of the ink, examples of the liquid may be, for example, a pretreatment liquid which is to be discharged onto the recording paper prior to the ink upon the printing, and water which is to be sprayed to the vicinities of the nozzles 40 of the recording head 39 in order to prevent the nozzles 40 of the recording head 39 from being dried.

What is claimed is:

1. A tank, comprising:

a frame having a first side and a second side;

a first film attached to the first side of the frame to form a liquid storage chamber with the frame; and a second film attached to the second side of the frame to form a liquid outflow passage with the frame, the liquid outflow passage communicated with the liquid storage chamber, wherein the first film and the second film face each other, and when viewed in a facing direction of the first film and the second film, the liquid storage chamber and the liquid outflow passage overlap with each other.

2. The tank according to claim 1, wherein the liquid outflow passage is communicated with the liquid storage chamber via an opening formed at a lower end part of the liquid storage chamber.

3. The tank according to claim 1, wherein the frame defines an atmosphere communication passage above the liquid storage chamber.

4. The tank according to claim 3, wherein the atmosphere communication passage is positioned above the liquid outflow passage.

5. The tank according to claim 4, wherein the atmosphere communication passage includes a first part defined by the first film and a second part defined by the second film.

6. The tank according to claim 1, wherein the liquid outflow passage includes an extending part extending upward.

7. The tank according to claim 6, wherein the frame has a front wall and a rear wall, the frame defines an atmosphere communication passage, and the extending part of the liquid outflow passage is nearer to the rear wall than the atmosphere communication passage.

8. A liquid-consuming apparatus, comprising:

the tank as defined in claim 2, and a liquid-consumer configured to receive the liquid that flows out from the liquid storage chamber through the liquid outflow passage.

* * * * *